United States Patent
Ogura

(10) Patent No.: US 10,670,691 B2
(45) Date of Patent: Jun. 2, 2020

(54) POSITIONING SYSTEM

(71) Applicant: DAIKIN INDUSTRIES, LTD., Osaka-shi, Osaka (JP)

(72) Inventor: Takanori Ogura, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 200 days.

(21) Appl. No.: 15/515,493

(22) PCT Filed: May 27, 2015

(86) PCT No.: PCT/JP2015/065274
§ 371 (c)(1),
(2) Date: Mar. 29, 2017

(87) PCT Pub. No.: WO2016/051859
PCT Pub. Date: Apr. 7, 2016

(65) Prior Publication Data
US 2017/0219682 A1    Aug. 3, 2017

(30) Foreign Application Priority Data

Sep. 30, 2014 (JP) .................................. 2014-202336

(51) Int. Cl.
*G01S 5/02* (2010.01)
*G01S 11/06* (2006.01)
*G01S 5/00* (2006.01)

(52) U.S. Cl.
CPC .......... *G01S 5/0289* (2013.01); *G01S 5/0009* (2013.01); *G01S 5/02* (2013.01); *G01S 5/0221* (2013.01);
(Continued)

(58) Field of Classification Search
CPC .......... H04W 64/00–006; G01S 5/0242; G01S 5/0221; H04B 17/27
(Continued)

(56) References Cited

U.S. PATENT DOCUMENTS 5,095,500 A * 3/1992 Tayloe ................. H04W 24/00
379/32.01
6,011,487 A * 1/2000 Plocher ................. G01S 13/878
235/383
(Continued)

FOREIGN PATENT DOCUMENTS

EP        1 195 614 A1    4/2002
JP     2005-227167 A      8/2005
(Continued)

OTHER PUBLICATIONS

International Preliminary Report of corresponding PCT Application No. PCT/JP2015/065274 dated Apr. 13, 2017.
(Continued)

*Primary Examiner* — Edward F Urban
*Assistant Examiner* — Rui M Hu
(74) *Attorney, Agent, or Firm* — Global IP Counselors, LLP

(57) ABSTRACT

A positioning system uses radio wave strengths of radio waves received from first and second wireless transmission terminals movable through an indoor space to locate positions of the terminals. The positioning system includes plural wireless receivers disposed in the indoor space, and a position estimating component that estimates the positions of the terminals based on positions of the receivers using first and second position estimation data in a limited range of the reception data generatable by the receivers. The receivers detect the radio wave strengths and can generate reception data including information relating to the radio wave strengths. At least one of the position estimating component and the receivers acquires the first and second position estimation data limited to first and second set regions suited to the first and second wireless transmission terminals from the reception data receivable relating to the (Continued)

first and second wireless transmission terminals, respectively.

15 Claims, 16 Drawing Sheets

(52) U.S. Cl.
CPC .......... *G01S 5/0252* (2013.01); *G01S 5/0278* (2013.01); *G01S 11/06* (2013.01)

(58) Field of Classification Search
USPC .................................. 455/456.1–457, 404.2
See application file for complete search history.

(56) References Cited

U.S. PATENT DOCUMENTS

| | | | | |
|---|---|---|---|---|
| 6,236,335 B1* | 5/2001 | Goodwin, III | ........ | G01S 5/0252 340/8.1 |
| 6,574,478 B1* | 6/2003 | Mortensen | ................ | G01S 5/06 455/11.1 |
| 6,574,482 B1* | 6/2003 | Radomsky | ............ | A61B 5/1113 455/517 |
| 7,072,669 B1* | 7/2006 | Duckworth | ........... | G01S 5/0215 455/404.2 |
| 7,116,988 B2* | 10/2006 | Dietrich | ................ | G01S 5/0221 455/456.1 |
| 7,312,752 B2* | 12/2007 | Smith | ..................... | G01S 5/021 342/464 |
| 7,403,111 B2* | 7/2008 | Tessier | ...................... | G01S 1/68 340/522 |
| 7,640,026 B2* | 12/2009 | Cameron | ............. | H04W 64/00 455/418 |
| 7,742,456 B2* | 6/2010 | Kawaguchi | ........... | H04W 64/00 370/338 |
| 7,848,766 B2* | 12/2010 | Ogino | .................... | H04W 64/00 455/456.1 |
| 7,966,021 B2* | 6/2011 | Dietrich | ................ | H04W 64/00 455/456.1 |
| 8,155,662 B2* | 4/2012 | Zill | ........................... | G01S 5/02 455/423 |
| 8,190,730 B2* | 5/2012 | Dempsey | .................. | G01S 5/02 709/224 |
| 8,229,457 B2* | 7/2012 | Shen | ......................... | G01S 5/12 342/450 |
| 8,346,281 B2* | 1/2013 | Noonan | ................. | H04W 48/04 455/456.1 |
| 8,433,334 B2* | 4/2013 | Huang | ...................... | G01S 5/02 455/456.1 |
| 8,725,167 B2* | 5/2014 | Siomina | ................ | G01S 5/0036 455/456.1 |
| 8,725,182 B2* | 5/2014 | Jen | ......................... | H04W 64/00 340/539.13 |
| 8,825,078 B1* | 9/2014 | Mishra | ................ | H04W 64/003 455/456.1 |
| 8,831,594 B2* | 9/2014 | Naguib | ................... | G01S 5/021 455/424 |
| 10,410,499 B2* | 9/2019 | Amir | ..................... | G08B 25/016 |
| 2003/0043073 A1* | 3/2003 | Gray | ..................... | G01S 5/0215 342/465 |
| 2003/0063589 A1* | 4/2003 | Haines | .................. | H04W 64/00 370/338 |
| 2005/0003828 A1* | 1/2005 | Sugar | ..................... | H04W 24/00 455/456.1 |
| 2005/0136845 A1* | 6/2005 | Masuoka | .............. | G01S 5/0294 455/67.14 |
| 2006/0240840 A1* | 10/2006 | Morgan | .............. | H04W 64/003 455/456.1 |
| 2007/0032248 A1* | 2/2007 | Ogino | ................... | H04W 64/00 455/456.1 |
| 2007/0104157 A1* | 5/2007 | Kawaguchi | ........... | H04W 64/00 370/338 |
| 2007/0178922 A1 | 8/2007 | Yamada et al. | | |
| 2009/0003490 A1* | 1/2009 | Nadler | .................. | H04W 64/00 375/316 |
| 2010/0087205 A1* | 4/2010 | Kong | ..................... | H04W 64/00 455/456.1 |
| 2010/0265092 A1* | 10/2010 | Kim | ..................... | H04W 64/003 340/8.1 |
| 2013/0059602 A1* | 3/2013 | Cho | .......................... | G01S 5/02 455/456.1 |
| 2013/0109413 A1* | 5/2013 | Das | ........................ | H04W 64/00 455/456.6 |
| 2013/0122941 A1* | 5/2013 | Das | ........................ | H04W 64/00 455/456.5 |
| 2014/0342756 A1* | 11/2014 | Houri | .................... | H04W 4/025 455/456.2 |
| 2015/0094085 A1* | 4/2015 | Agrawal | .............. | A01K 1/0114 455/456.1 |
| 2015/0334676 A1* | 11/2015 | Hart | ....................... | H04W 4/029 455/456.1 |
| 2016/0037300 A1* | 2/2016 | Vitek | ...................... | H04W 4/023 455/456.3 |
| 2016/0349353 A1* | 12/2016 | Wang | ...................... | H04W 4/02 |
| 2017/0188331 A1* | 6/2017 | Rao | ........................ | H04W 4/029 |
| 2017/0280281 A1* | 9/2017 | Pandey | ................ | H04B 17/318 |
| 2018/0106618 A1* | 4/2018 | Cerchio | ................ | H04W 4/027 |
| 2018/0321356 A1* | 11/2018 | Kulkarni | .................. | G01S 5/14 |

FOREIGN PATENT DOCUMENTS

| | | |
|---|---|---|
| JP | 2007-329887 A | 12/2007 |
| JP | 2010-139447 A | 6/2010 |
| JP | 2011-145093 A | 7/2011 |
| JP | 2011-203129 A | 10/2011 |
| JP | 2012-202747 A | 10/2012 |
| JP | 2013-152133 A | 8/2013 |
| WO | 00/75684 A1 | 12/2000 |

OTHER PUBLICATIONS

European Search Report of corresponding EP Application No. 15 84 6502.1 dated May 24, 2018.
International Search Report of corresponding PCT Application No. PCT/JP2015/065274 dated Sep. 1, 2015.

\* cited by examiner

| TIME | RECEIVER ID | TERMINAL ID | COMMUNICATION CONTENT | RADIO WAVE STRENGTH (dBm) |
|---|---|---|---|---|
| T1 | B | α | DAα1 | −40 |
| T1 | A | β | DAβ1 | −60 |
| ... | ... | ... | ... | ... |
| T2 | C | α | DAα2 | −70 |
| T3 | H | β | DAβ3 | −40 |
| T5 | L | α | DAα5 | −65 |
| ... | ... | ... | ... | ... |

POSITIONING SYSTEM

CROSS-REFERENCE TO RELATED APPLICATIONS

This U.S. National stage application claims priority under 35 U.S.C. § 119(a) to Japanese Patent Application No. 2014-202336, filed in Japan on Sep. 30, 2014, the entire contents of which are hereby incorporated herein by reference.

TECHNICAL FIELD

The present invention relates to a positioning system that uses the strength of a radio wave to locate the position of a wireless transmission terminal.

BACKGROUND ART

In recent years there has been an increase in services performed after identifying the position where a person is. When providing a service after identifying the position where a person is, there are cases where, utilizing a large-scale system run by a public institution or a telecommunications carrier, such as the Global Positioning System (GPS) or a mobile telephone communication network, a mobile terminal itself identifies its position and provides the service by means of an application in the mobile terminal. In addition to cases such as this one, there are cases where, for example, in regard to a relatively small area such as a commercial facility, a service provider acquires information for identifying the position of the mobile terminal in an indoor space of a commercial facility or the like, and an estimating device of the service provider associated with the facility identifies the position where the person is to thereby provide the service.

In the case where the position of the person is estimated and the service is provided outside the mobile terminal in this way, when the position is estimated using the radio wave strength of a wireless transmission terminal received at a base station such as disclosed in JP A No. 2007-329887 for example, data including the radio wave strength, which is information for identifying the position of the wireless transmission terminal, are transmitted from the base station to the estimating device that estimates the position.

SUMMARY

Technical Problem

Systems where data including the radio wave strength are transmitted to an estimating device such as disclosed in JP-A No. 2007-329887 adopt an approach where a fixed threshold value is provided with respect to the radio wave strength, and the communication load and the computational load are reduced by not allowing the transmission of data including a radio wave strength equal to or less than the threshold value. However, when the individual differences and the carrying circumstances of wireless transmission terminals whose positions are to be located vary, cases end up arising where even data relevant to positioning become excluded so that the position-fixing accuracy drops or where the communication load and the computational load become larger because unnecessary data are not excluded.

It is a object of the present invention to reduce the computational load in a positioning system that uses radio wave strength to estimate the position of a wireless transmission terminal.

Solution to Problem

A positioning system pertaining to a first aspect of the present invention is a positioning system that uses the radio wave strength of a radio wave received from a first wireless transmission terminal movable through a predetermined indoor space to locate the position of the first wireless transmission terminal and uses the radio wave strength of a radio wave received from a second wireless transmission terminal movable through the indoor space to locate the position of the second wireless transmission terminal, the positioning system comprising: plural wireless receivers that are disposed in the indoor space, detect the radio wave strengths of the radio waves received from the first wireless transmission terminal and the second wireless transmission terminal, and can generate reception data including information relating to the radio wave strengths, and a position estimating component that estimates the positions of the first wireless transmission terminal and the second wireless transmission terminal on the basis of the disposed positions of the plural wireless receivers using first position estimation data and second position estimation data in a limited range of the reception data generatable by the plural wireless receivers, wherein at least one of the position estimating component and the plural wireless receivers acquires the first position estimation data limited to a first set region suited to the first wireless transmission terminal from among the reception data receivable in regard to the first wireless transmission terminal and acquires the second position estimation data limited to a second set region suited to the second wireless transmission terminal from among the reception data receivable in regard to the second wireless transmission terminal.

In the positioning system of the first aspect, the first set region suited to the first wireless transmission terminal and the second set region suited to the second wireless transmission terminal are distinctively provided as ranges in which to acquire the reception data, so the first position estimation data and the second position estimation data for the first wireless transmission terminal and the second wireless transmission terminal can be appropriately narrowed down by means of the first set region and the second set region while suppressing a drop in the position-fixing accuracy of the first wireless transmission terminal and the second wireless transmission terminal.

A positioning system pertaining to a second aspect of the present invention is the positioning system of the first aspect, wherein at least one of the position estimating component and the plural wireless receivers sets the first set region by using, as the first position estimation data, the reception data of a radio wave strength equal to or greater than a first reference strength and sets the second set region by using, as the second position estimation data, the reception data of a radio wave strength equal to or greater than a second reference strength.

In the positioning system of the second aspect, in a case where the radio wave strengths of the first wireless transmission terminal and the second wireless transmission terminal are different, if the first set region and the second set region are set in common using a reference strength suited to the wireless transmission terminal with the higher radio wave strength, the position-fixing accuracy of the wireless transmission terminal with the lower radio wave strength becomes poor, and if the first set region and the second set region are set in common using a reference strength suited to the wireless transmission terminal with the lower radio wave strength, the computational load increases because of the increase in the data amount of the wireless transmission terminal with the higher radio wave strength, but by setting the first set region and the second set region using the first reference strength and the second reference strength suited to the each of the wireless transmission terminals, a reduction of the computational load and a suppressing of a drop in the position-fixing accuracy can be simultaneously achieved.

A positioning system pertaining to a third aspect of the present invention is the positioning system of the second aspect, wherein at least one of the position estimating component and the plural wireless receivers dynamically changes the first reference strength and the second reference strength in accordance with the passage of time.

In the positioning system of the third aspect, at least one of the position estimating component and the plural wireless receivers dynamically changes the first reference strength and the second reference strength, so it becomes possible to appropriately respond to changes in the radio wave strengths of the first wireless transmission terminal and the second wireless transmission terminal.

A positioning system pertaining to a fourth aspect of the present invention is the positioning system of the second aspect or the third aspect, wherein at least one of the position estimating component and the plural wireless receivers sets, before an operation period in which the position estimating component estimates the positions of the first wireless transmission terminal and the second wireless transmission terminal, a determination period and in the determination period determines the radio wave strengths of the radio waves received from the first wireless transmission terminal and the second wireless transmission terminal to set the first reference strength and the second reference strength.

In the positioning system of the fourth aspect, the determination period for setting the first reference strength and the second reference strength is set before the operation period, so it becomes easy to accurately set the first reference strength and the second reference strength.

A positioning system pertaining to a fifth aspect of the present invention is the positioning system of any of the first aspect to the fourth aspect, wherein at least one of the position estimating component and the plural wireless receivers sets the first set region using a geographical location centered on the wireless receiver at which the radio wave strength of the radio wave received from the first wireless transmission terminal is the strongest out of the plural wireless receivers and sets the second set region using a geographical location centered on the wireless receiver at which the radio wave strength of the radio wave received from the second wireless transmission terminal is the strongest out of the plural wireless receivers.

In the positioning system of the fifth aspect, at least one of the position estimating component and the plural wireless receivers sets the first set region and the second set region using geographical locations centered on the wireless receivers at which the radio wave strengths of the radio waves received from the first wireless transmission terminal and the second wireless transmission terminal are the strongest out of the plural wireless receivers, so the data of the wireless receivers in areas outside these geographical locations become discarded, but while the drop in the position-fixing accuracy is small even without using communication data whose radio wave strength is weak over a long distance, the computational load can be reduced by significantly leaving out communication data whose radio wave strength is weak. Furthermore, it becomes difficult for the positioning system to lose track of the first wireless transmission terminal and the second wireless transmission terminal when the radio wave strengths of the first wireless transmission terminal and the second wireless transmission terminal have fluctuated.

A positioning system pertaining to a sixth aspect of the present invention is the positioning system of any of the first aspect to the fifth aspect, wherein at least one of the position estimating component and the plural wireless receivers sets the first set region and the second set region after the first wireless transmission terminal and the second wireless transmission terminal have been detected.

In the positioning system of the sixth aspect, the detection of the first wireless transmission terminal and the second wireless transmission terminal is not obstructed for the purpose of setting the first set region and the second set region because the point in time when the first set region and the second set region are set is after the first wireless transmission terminal and the second wireless transmission terminal have been detected, so the certainty of the detection of the first wireless transmission terminal and the second wireless transmission terminal is improved.

A positioning system pertaining to a seventh aspect of the present invention is the positioning system of any of the first aspect to the sixth aspect, wherein the position estimating component acquires the first position estimation data limited to the first set region and acquires the second position estimation data limited to the second set region from the reception data regarding the first wireless transmission terminal and the second wireless transmission terminal that have been transmitted from the plural wireless receivers.

In the positioning system of the seventh aspect, there is no longer the need for the setting of the first set region and the second set region to be performing from the position estimating component with respect to the wireless receivers, so it becomes easier to simplify operations with respect to the wireless receivers.

A positioning system pertaining to an eighth aspect of the present invention is the positioning system of any of the first aspect to the seventh aspect, wherein the plural wireless receivers use the first set region and the second set region that have been transmitted from the position estimating component to acquire the first position estimation data limited to the first set region and acquire the second position estimation data limited to the second set region from the reception data regarding the first wireless transmission terminal and the second wireless transmission terminal and transmit the first position estimation data and the second position estimation data to the position estimating component.

In the positioning system of the eighth aspect, only a limited number of the plural wireless receivers transmit the first position estimation data and the second position estimation data to the position estimating component, so reception data not needed for position estimation can be prevented from being transmitted from the plural wireless receivers to the position estimating component.

A positioning system pertaining to a ninth aspect of the present invention is the positioning system pertaining to any of the first aspect to the eighth aspect, wherein the plural wireless receivers include a first wireless receiver and a second wireless receiver, and the position estimating component estimates the positions of the first wireless transmission terminal and the second wireless transmission terminal at least using the first position estimation data and the second position estimation data corresponding to plural times transmitted from the first wireless receiver and the second wireless receiver.

In the positioning system of the ninth aspect, the position estimating component estimates the positions of the first wireless transmission terminal and the second wireless transmission terminal using the first position estimation data and the second position estimation data corresponding to plural times transmitted from the first wireless receiver and the second wireless receiver, so movement along a straight line joining the first wireless receiver and the second wireless receiver can be estimated. For that reason, in a case where the first wireless transmission terminal and the second wireless transmission terminal move on a straight line, such as in the case of an aisle for example, sufficient position estimation becomes possible with a small computational load.

A positioning system pertaining to a tenth aspect of the present invention is a positioning system that uses the radio wave strength of a radio wave received from a wireless transmission terminal movable through a predetermined indoor space to locate the position of the wireless transmission terminal, the positioning system comprising: plural wireless receivers that are disposed in the indoor space, detect the radio wave strength of the radio wave received from the wireless transmission terminal, and can generate reception data including information relating to the radio wave strength; and a position estimating component that estimates the position of the wireless transmission terminal on the basis of the disposed positions of the plural wireless receivers using, as position estimation data, the reception data of a radio wave strength equal to or greater than a set threshold value in the reception data generatable by the plural wireless receivers, wherein when the reception data satisfy a redetermination condition relating to the set threshold value, at least one of the position estimating component and the plural wireless receivers determines the radio wave strength of the radio wave received from the wireless transmission terminal to reset the set threshold value.

In the positioning system of the tenth aspect, the reception data of a radio wave strength smaller than the set threshold value are no longer used for position estimation because the position estimating component uses, as the position estimation data, the reception data of a radio wave strength equal to or greater than the set threshold value in the reception data generatable by the plural wireless receivers, so the reception data used for position estimation decrease, an increase in the data amount is suppressed, and the computational load is reduced. Furthermore, by resetting the set threshold value when the radio wave strength of the reception data has changed to a state satisfying the redetermination condition, the set threshold value can be kept at a value good for use in position estimation. Because the set threshold value is kept at a value good for use in position estimation in this way, a situation where the radio wave strength drops and the positioning system loses track of the wireless transmission terminal can be prevented, and an increase in the load of the positioning system caused by the radio wave strength having become higher can be suppressed.

A positioning system pertaining to an eleventh aspect of the present invention is the positioning system of the tenth aspect, wherein at least one of the position estimating component and the plural wireless receivers uses, as the redetermination condition, a situation where the difference between the set threshold value and the highest radio wave strength out of the position estimation data becomes equal to or greater than a determination value.

In the positioning system of the eleventh aspect, a situation where the difference between the set threshold value and the highest radio wave strength out of the position estimation data becomes equal to or greater than the determination value is used as the redetermination condition, so the determination for resetting the set threshold value can be certainly performed when the radio wave strength changes and the set threshold value is unfit for balancing load reduction and estimation accuracy.

A positioning system pertaining to a twelfth aspect of the present invention is the positioning system of the tenth aspect, wherein at least one of the position estimating component and the plural wireless receivers uses, as the redetermination condition, a situation where a rate of change at which the highest radio wave strength out of the position estimation data changes becomes equal to or greater than a determination rate of change.

In the positioning system of the twelfth aspect, a condition where the rate of change at which the highest radio wave strength out of the position estimation data changes becomes equal to or greater than the determination rate of change is used as the redetermination condition, so when the radio wave strength changes and the set threshold value becomes unfit for balancing load reduction and estimation accuracy, the symptoms thereof can also be taken into account to perform the determination for resetting the set threshold value.

A positioning system pertaining to a thirteenth aspect of the present invention is the positioning system of any of the tenth aspect to the twelfth aspect, wherein at least one of the position estimating component and the plural wireless receivers is configured to not perform the determination for resetting the set threshold value within a predetermined grace period after having reset the set threshold value.

In the positioning system of the thirteenth aspect, a situation where the redetermination is frequently performed can be avoided to prevent an increase in the system load caused by frequently performing the redetermination.

A positioning system pertaining to a fourteenth aspect of the present invention is the positioning system of the thirteenth aspect, wherein at least one of the position estimating component and the plural wireless receivers sets the grace period in a case where it has reset the set threshold value a predetermined number of times or more within a certain period.

In the positioning system of the fourteenth aspect, setting the grace period in a case where the set threshold value has been reset a predetermined number of times or more within a certain period means, in other words, not providing the grace period when a situation where the redetermination is frequently performed is not arising, and a situation where the set threshold value is not reset for a long period as a result of having provided the grace period can be avoided.

A positioning system pertaining to a fifteenth aspect of the present invention is the positioning system of any of the tenth aspect to the fourteenth aspect, wherein the position estimating component, when resetting the set threshold value, sets a redetermination period and lowers the set threshold value or cancels the setting of the set threshold value in regard to the wireless receivers in a predetermined range including the position where the wireless transmission terminal had been before the redetermination period.

In the positioning system of the fifteenth aspect, even when the wireless transmission terminal moves in accompaniment with the movement of the terminal carrier, the position where the wireless transmission terminal is when the redetermination period has started is included in the predetermined range envisioned from the position where the wireless transmission terminal was before the redetermination period, so at the time of the redetermination the reception data from the wireless receivers outside the predetermined range can be left out from the data for the redetermination.

A positioning system pertaining to a sixteenth aspect of the present invention is the positioning system of the fifteenth aspect, wherein the position estimating component sets the predetermined range excluding outer peripheral areas of the disposed positions of the plural wireless receivers.

In the positioning system of the sixteenth aspect, the reception data of outer peripheral areas with little potential to be effectively utilized in the redetermination can be left out at the time of the redetermination.

Advantageous Effects of Invention

In the positioning system pertaining to the first aspect of the present invention, an increase in the data amount associated with an increase in the number of wireless transmission terminals can be controlled to reduce the computational load.

In the positioning system pertaining to the second aspect of the present invention, the computational load can be reduced while suppressing a drop in the position-fixing accuracy.

In the positioning system pertaining to the third aspect of the present invention, the position-fixing accuracy can be stabilized.

In the positioning system pertaining to the fourth aspect of the present invention, by accurately setting the first reference strength and the second reference strength, an increase in the data amount can be suppressed.

In the positioning system pertaining to the fifth aspect of the present invention, an alleviation of the computational load takes place while a drop in the position-fixing accuracy is suppressed, and the positioning system is highly adaptable to fluctuations in the radio wave strength.

In the positioning system pertaining to the sixth aspect of the present invention, the stability of the system is improved.

In the positioning system pertaining to the seventh aspect of the present invention, it becomes easier to realize a simple system configuration.

In the positioning system pertaining to the eighth aspect of the present invention, the communication load can be reduced.

In the positioning system pertaining to the ninth aspect of the present invention, sufficient position estimation can be performed with a small computational load by the two wireless receivers comprising the first wireless receiver and the second wireless receiver.

In the positioning system pertaining to the tenth aspect of the present invention, the set threshold value can be kept at a proper value and an increase in the data amount can be suppressed to reduce the computational load.

In the positioning system pertaining to the eleventh aspect of the present invention, the determination for resetting the set threshold value can be certainly performed to keep the set threshold value at a proper value.

In the positioning system pertaining to the twelfth aspect of the present invention, the resetting of the set threshold value can be performed early to keep the set threshold value at a proper value.

In the positioning system pertaining to the thirteenth aspect of the present invention, an increase in the system load associated with performing the redetermination can be suppressed.

In the positioning system pertaining to the fourteenth aspect of the present invention, the occurrence of problems caused by the resetting not taking place for a long period as a result of having provided the grace period can be suppressed.

In the positioning system pertaining to the fifteenth aspect of the present invention, the computational load at the time of the redetermination can be reduced.

In the positioning system pertaining to the sixteenth aspect of the present invention, the computational load at the time of the redetermination can be reduced while performing an effective redetermination.

DESCRIPTION OF EMBODIMENTS

First Embodiment

Figure 1:
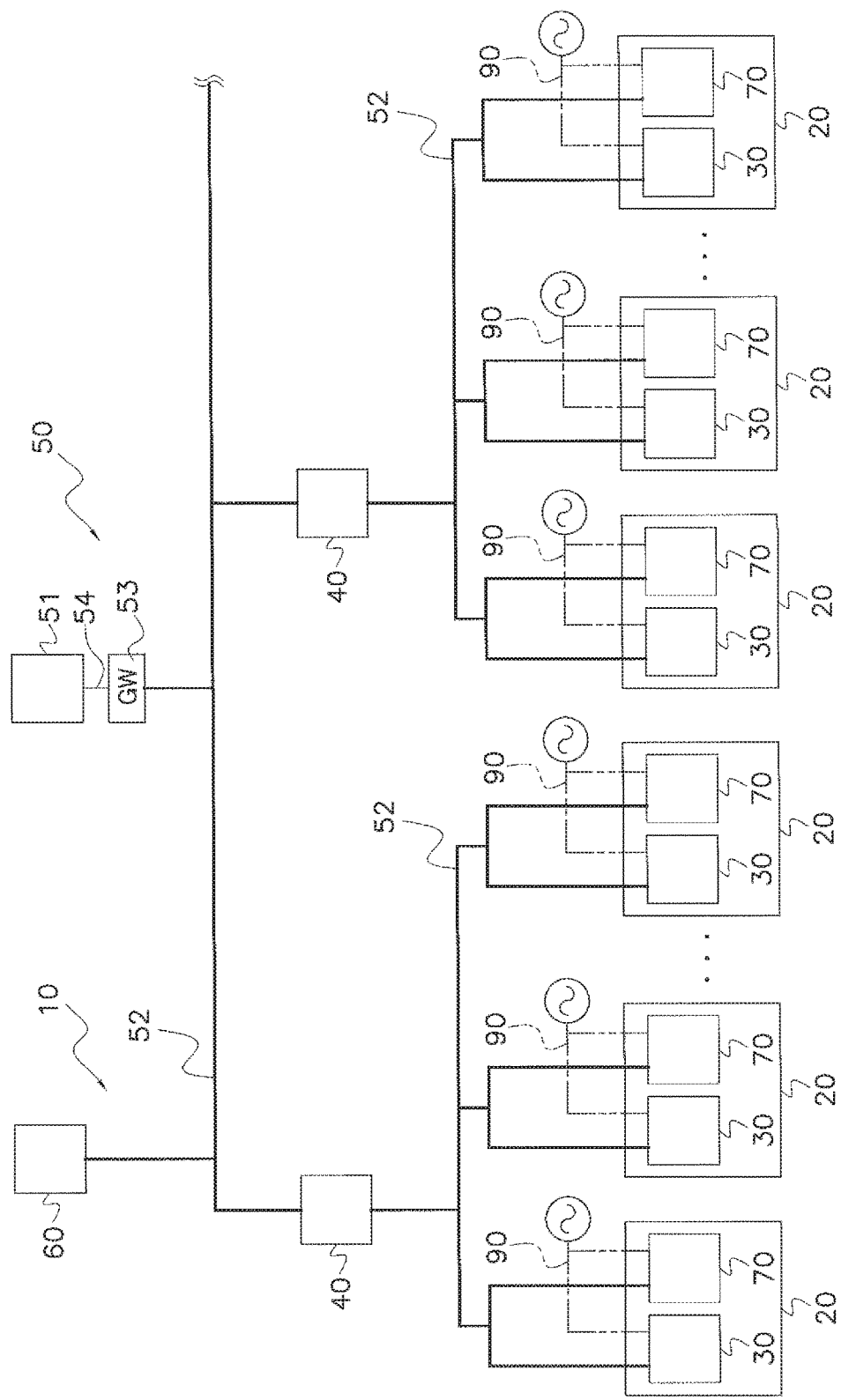
FIG. 1 is a block diagram for describing an overview of the configuration of a positioning system pertaining to a first embodiment.

A positioning system pertaining to a first embodiment of the present invention will be described below using the drawings. FIG. 1 is a block diagram for describing an overview of the configuration of the positioning system pertaining to the first embodiment of the present invention. A positioning system 10 shown in FIG. 1 is equipped with a section jointly used with an air conditioning system 50 and therefore has high performance despite being low-cost. Therefore, in the following description of the first embodiment, the air conditioning system 50 will be briefly described and then the positioning system 10 will be described.

(1) Overall Configuration

The positioning system 10 shown in FIG. 1 is configured using the air conditioning system 50, which is installed in a commercial facility in which there are numerous stores, such as a shopping mall, an outlet mall, a department store in a high-rise building, or an underground shopping center. Plural indoor machines 30 are connected to plural outdoor machines 40 to configure the air conditioning system 50, which is for air conditioning the inside of the commercial facility. All of the indoor machines 30 and all of the outdoor machines 40 in FIG. 1 are controlled by an air conditioning control device 51. The indoor machines 30 and the outdoor machines 40 are connected to each other by a data transmission line 52. Furthermore, the air conditioning control device 51 is connected to the outdoor machines 40 and the indoor machines 30 by the data transmission line 52, a gateway 53, and a network transmission line 54. Furthermore, air conditioning indoor units 20 including the indoor machines 30 are connected to air conditioning power supply lines 90. The air conditioning system 50 is a multi-type air conditioning system where a plurality of the indoor machines 30 are connected in parallel to each outdoor machine 40.

(2) Configuration of Positioning System (2-1)

Figure 2:
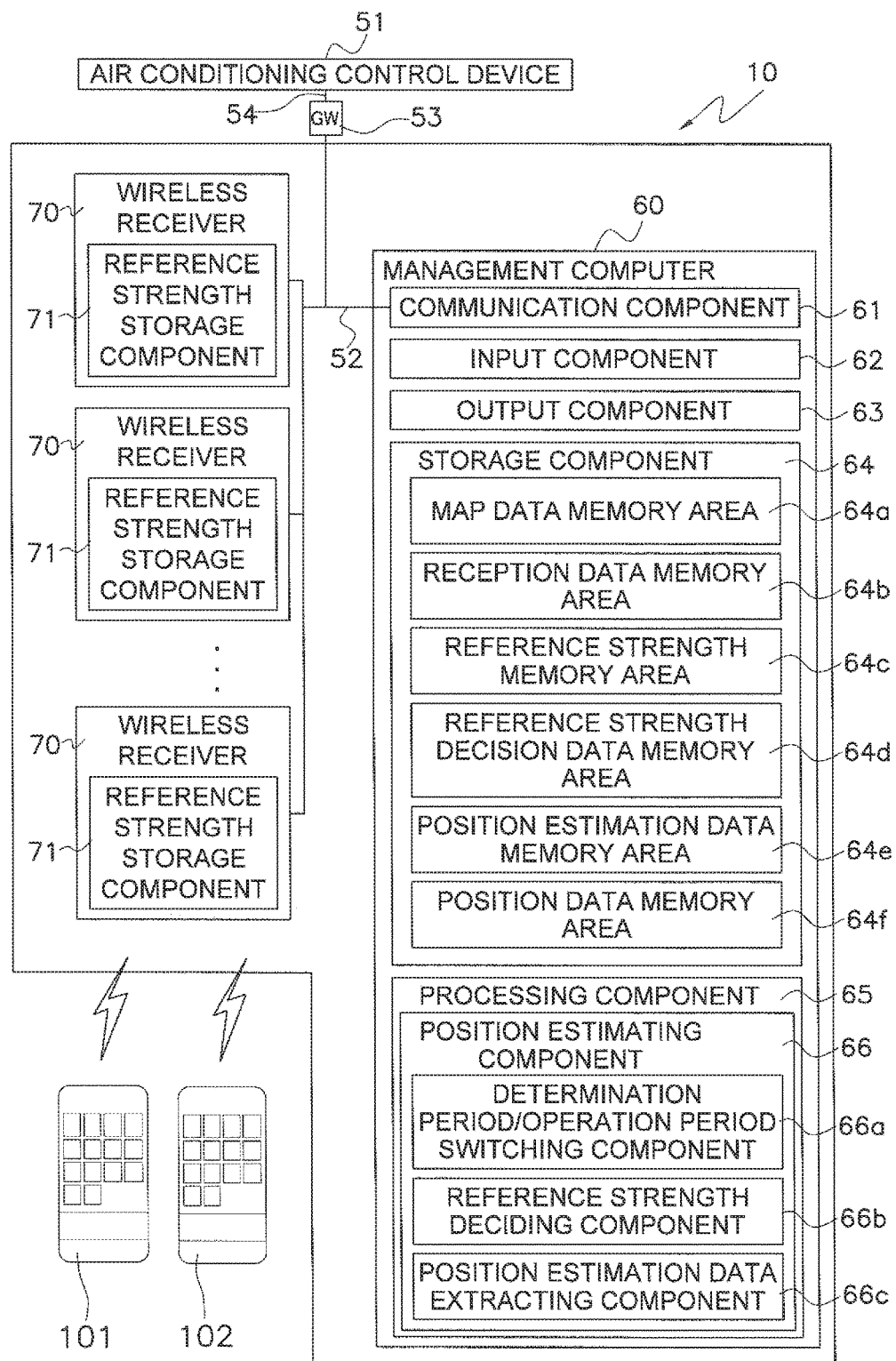
FIG. 2 is a block diagram for describing an overview of the configuration of the positioning system.

As shown in FIG. 1 and FIG. 2, the positioning system 10 is configured by a management computer 60 and plural wireless receivers 70 that are connected to each other by the data transmission line 52. The data transmission line 52 connecting the management computer 60 and the plural wireless receivers 70 to each other is commonized with the data transmission line 52 of the air conditioning system 50. The wireless receivers 70 are disposed in the air conditioning indoor units 20, which are provided in a ceiling in the commercial facility. One indoor machine 30 is installed together with one wireless receiver 70 in one air conditioning indoor unit 20. The air conditioning indoor units 20 are connected to the air conditioning power supply lines 90 and have electrical power supplied to them from the air conditioning power supply lines 90. Furthermore, the air conditioning power supply lines 90 also supply electrical power to the wireless receivers 70 and are shared by the positioning system 10 and the air conditioning system 50.

The wireless receivers 70 are used in a wireless LAN (Local Area Network) conforming to Wi-Fi or other standards or a wireless PAN (Personal Area Network) conforming to Bluetooth (registered trademark) or other standards, for example, and can communicate with plural wireless transmission terminals including a first wireless transmission terminal 101 and a second wireless transmission terminal 102 comprising smart phones, for example. The number of wireless transmission terminals capable of being handled by the wireless receivers 70 can be set greater than two, but in order to simplify the description an example will be described below where the first wireless transmission terminal 101 and the second wireless transmission terminal 102 are representative of plural wireless transmission terminals.

Figures 3, 4:
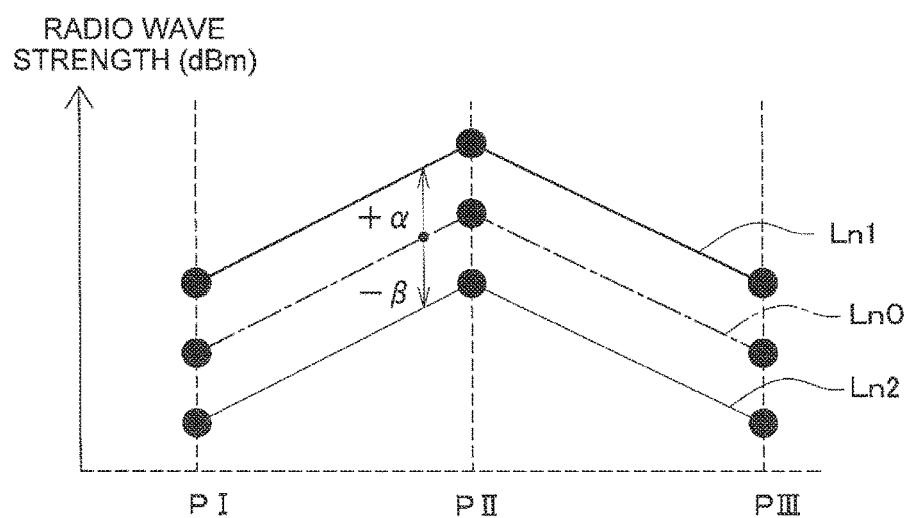
FIG. 3 is a drawing for describing reception data.
FIG. 4 is a graph for describing a method of deciding a first reference strength and a second reference strength.

Each wireless receiver 70 can detect reception times at which it has received reception data, terminal IDs (identification data) for identifying the first wireless transmission terminal 101 and the second wireless transmission terminal 102, and radio wave strengths of wireless communication relating to the reception data. Additionally, each wireless receiver 70 can send, through the data transmission line 52, reception data such as shown in FIG. 3 including reception time, terminal ID, communication content, and radio wave strength, together with its own receiver ID retained inside. It should be noted that the terminal ID of the first wireless transmission terminal 101 is a and the terminal ID of the second wireless transmission terminal 102 is 3.

Each wireless receiver 70 has a reference strength storage component 71. A reference strength corresponding to each terminal ID is stored in the reference strength storage component 71. Additionally, each wireless receiver 70 stops sending the reception data in a case where the radio wave strength of the radio wave that sent the reception data is lower than the reference strength.

(2-2) Management Computer 60

The management computer 60 is equipped with: a communication component 61 that sends data to and receives data from each wireless receiver 70 through the data transmission line 52; an input component 62 for inputting, from the outside to the inside of the management computer 60, input signals processable inside the management computer 60, such as keyboard character signals, for example; an output component 63 for outputting information to the outside of the management computer 60; a storage component 64 that stores data applied to the management computer 60 from the data transmission line 52 and the input component 62, for example; and a processing component 65 that processes the data applied from the data transmission line 52 and the input component 62, for example, as well as the data stored in the storage component 64.

(2-2-1) Storage Component 64

The storage component 64 has: a map data memory area 64a that stores map data of the indoor space in which the plural wireless receivers 70 are disposed; a reception data memory area 64b for storing the reception data transmitted from each wireless receiver 70; a reference strength memory area 64c that stores the reference strengths; a reference strength decision data memory area 64d that stores reference strength decision data used for deciding the reference strengths; a position estimation data memory area 64e that stores position estimation data used for position estimation; and a position data memory area 64*f*.

(2-2-2) Processing Component 65

The processing component 65 is configured to include a CPU. The CPU of the processing component 65 functions as a position estimating component 66 by reading and executing a program stored in the storage component 64. The position estimating component 66 includes a determination period/operation period switching component 66*a*, a reference strength deciding component 66*b*, and a position estimation data extracting component 66*c*.

The position estimating component 66, at a predetermined timing, reads first position estimation data and second position estimation data from the position estimation data memory area 64*e*, identifies the position of each wireless receiver 70 from the map data stored in the map data memory area 64*a*, and estimates the positions of the first wireless transmission terminal 101 and the second wireless transmission terminal 102. The position estimating component 66 estimates the position of the first wireless transmission terminal 101 using the characteristic that the radio wave strengths detected by the plural wireless receivers 70 at the same time attenuate in accordance with their propagation distance from the first wireless transmission terminal 101. In the same way, the position estimating component 66 estimates the position of the second wireless transmission terminal 102. The position estimating component 66 commands the storage component 64 to store in the position data memory area 64*f* the position data relating to the position of the first wireless transmission terminal 101 and the position of the second wireless transmission terminal 102 that have been estimated in this way.

The determination period/operation period switching component 66*a* switches between a determination period and an operation period.

The reference strength deciding component 66*b* decides a first reference strength for the first wireless transmission terminal 101 and a second reference strength for the second wireless transmission terminal 102 when the determination period/operation period switching component 66*a* has switched to the determination period. The reference strength deciding component 66*b* decides the first reference strength on the basis of the radio wave strengths of the first wireless transmission terminal 101 that were obtained in the determination period and decides the second reference strength on the basis of the radio wave strengths of the second wireless transmission terminal 102 that were obtained in the determination period. In this determination period, there is no application of the first reference strength and the second reference strength as threshold values, rather, the radio wave strengths detected by all the wireless receivers 70 are collected by the reference strength deciding component 66*b* for the purpose of deciding the reference strengths. The reference strength deciding component 66*b* commands the storage component 64 to store in the reference strength decision data memory area 64*d* the reference strength decision data including the times, receiver IDs, terminal IDs, and radio wave strengths that have been collected. The first reference strength and the second reference strength are decided, for example, by applying a statistical approach to the largest values of the radio wave strengths of the first wireless transmission terminal 101 and the largest values of the radio wave strengths of the second wireless transmission terminal 102 that are obtained at each time in the determination period. Specifically, for example, if the mean value of the largest values of the radio wave strengths of the first wireless transmission terminal 101 is calculated to be −40 dBm, then −50 dBm, which is just 10 dBm (an example of a predetermined value) smaller, is decided as the first reference strength. As the statistic, a statistic other than the mean value—for example, the median value and the mode value—may also be used. Furthermore, rather than applying a statistical approach to the time-series radio wave strength data as described above, the first reference strength and the second reference strength may also be decided by applying a statistical approach to the data of the radio wave strengths of all the wireless receivers 70 at the same time. Furthermore, if the first wireless transmission terminal 101 and the second wireless transmission terminal 102 are disposed in a disposed position PII in the middle of disposed positions PI, PII, and PIII arranged at equidistant intervals on a straight line shown in FIG. 4, the same extent of radio wave attenuation can be seen at disposed positions PI and PIII separated by the same distance provided that there is no attenuation or reflection caused by obstacles or the like. Therefore, the first reference strength and the second reference strength may also be decided by using a statistical approach to find reference line Ln0, line Ln1 for the radio wave strength of the first wireless transmission terminal 101, and line Ln2 for the radio wave strength of the second wireless transmission terminal 102 at each position of the first wireless transmission terminal 101 and the second wireless transmission terminal 102, which actually move separately, and calculating the magnitudes of the divergences of lines Ln1 and Ln2 from reference line Ln0.

The reference strength deciding component 66*b*, when the determination period ends, causes the storage component 64 to store in the reference strength memory area 64*c* the first reference strength and the second reference strength that have been decided. Furthermore, the reference strength deciding component 66*b* commands the communication component 61 to transmit the first reference strength and the second reference strength to the reference strength storage components 71 of all the wireless receivers 70. Additionally, all the wireless receivers 70 store the first reference strength and the second reference strength in their reference strength storage components 71 in response to a command from the management computer 60 and transmit the position estimation data using the first reference strength and the second reference strength as threshold values.

The position estimation data extracting component 66*c*, when the determination period/operation period switching component 66*a* has switched to the operation period, extracts as the position estimation data the times, receiver IDs, terminal IDs, and radio wave strengths included in the reception data. The position estimation data extracting component 66*c* classifies the extracted position estimation data according to terminal ID and commands the storage component 64 to store in the position estimation data memory area 64*e* the first position estimation data for the first wireless transmission terminal 101 and the second position estimation data for the second wireless transmission terminal 102.

(3) Map Data

Figure 5:
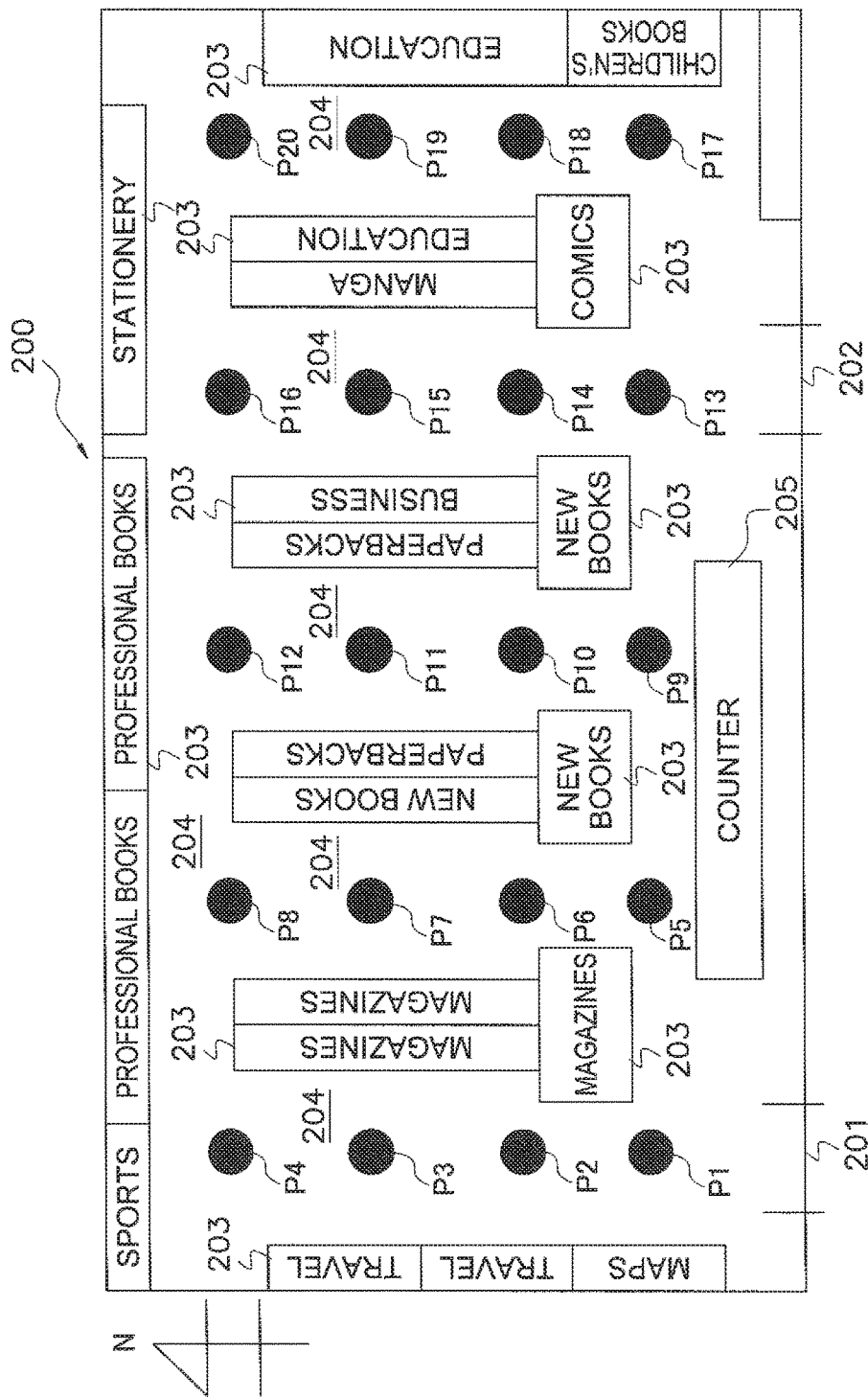
FIG. 5 is a layout diagram for describing an example of an indoor space.

Here, the indoor space will be described by way of the space inside a store such as shown in FIG. 5. Here, an example regarding the inside of a single store will be described, but the indoor space may also be the space in a facility such as a shopping mall. A bookstore 200 shown in FIG. 5 is provided with doorways 201 and 202 in two places. Plural bookshelves 203 and aisles 204 are provided and books of various genres are displayed inside the bookstore 200. Furthermore, the bookstore 200 is provided with a counter 205 for payment. Additionally, twenty wireless receivers 70 are disposed in disposed positions P1 to P20 in the ceiling above the aisles 204. In this case, the books are an example of products and the bookshelves 203 are an example of product shelves.

The disposed positions of the plural bookshelves 203, the plural aisles 204, the counter 205, and the plural wireless receivers 70 in the bookstore 200 are stored as map data in the map data memory area 64a using coordinates, such as X meters north and Y meters east using the doorway 201 as a base point.

(4) Operation of Positioning System 10 During Operation Period

Figure 6:
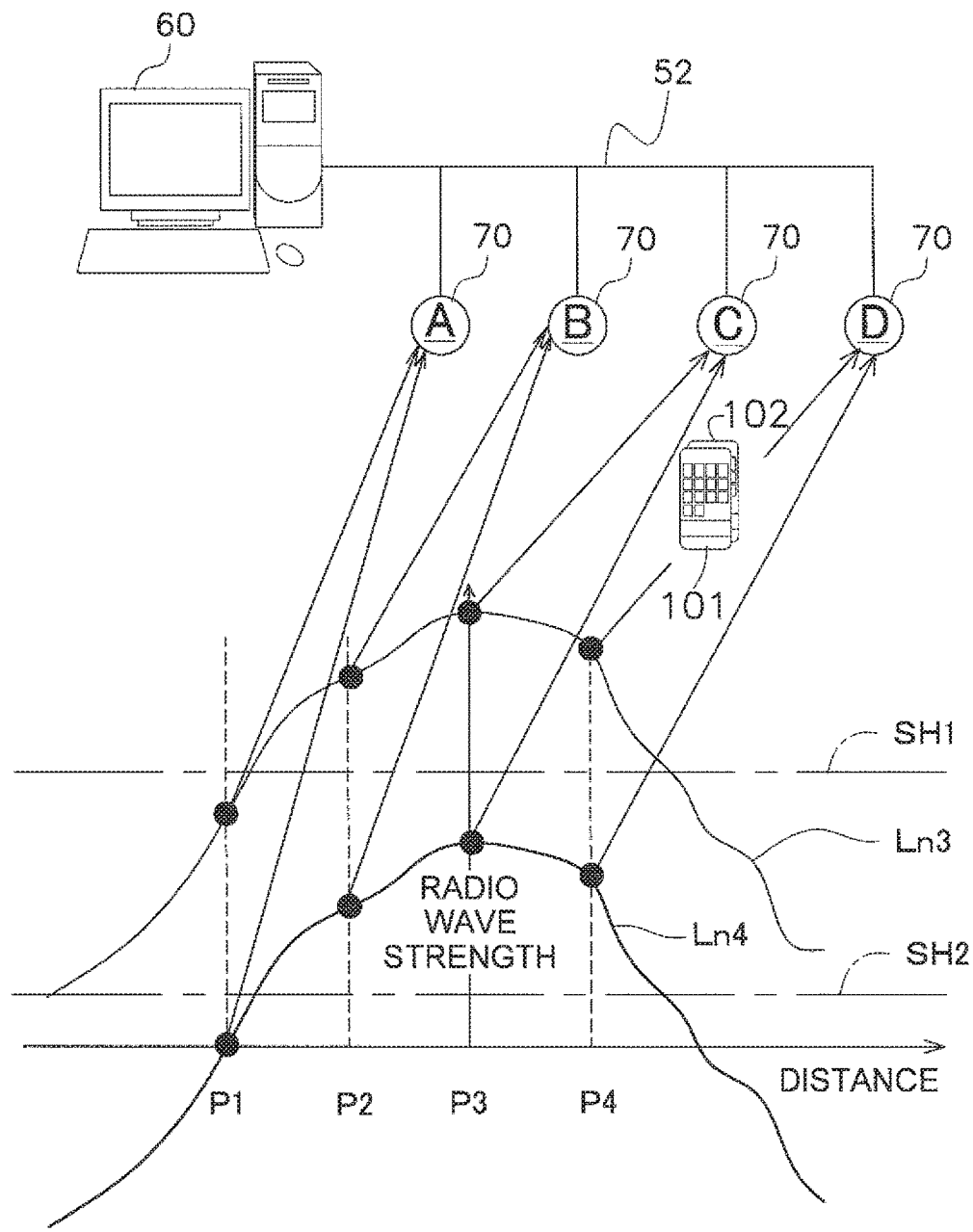
FIG. 6 is a conceptual diagram for describing data transmission during an operation period using the first reference strength and the second reference strength.

FIG. 6 is a conceptual diagram for describing data transmission during the operation period using the first reference strength and the second reference strength. In FIG. 6, curved line Ln3 represents the relationship between distance and radio wave strength when the first wireless transmission terminal 101 is in position P3. Furthermore, curved line Ln4 represents the relationship between distance and radio wave strength when the second wireless transmission terminal 102 is in position P3. Moreover, straight line SH1 represents the first reference strength that has been set in all the wireless receivers 70, and straight line SH2 represents the second reference strength that has been set in all the wireless receivers 70. It should be noted that the alphabetical letters in the circles are receiver IDs.

Figure 7:
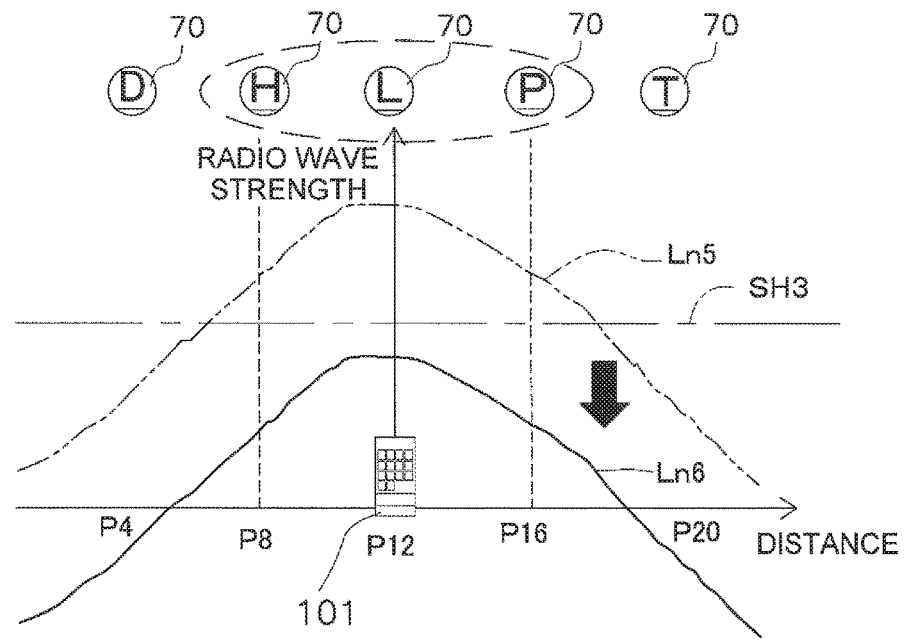
FIG. 7 is a conceptual diagram for describing a circumstance in a case where radio wave strength has suddenly fluctuated.

The receivers 70 disposed in disposed positions P2, P3, and P4 are receiving the radio wave from the first wireless transmission terminal 101 at radio wave strengths equal to or greater than the first reference strength. However, the wireless receiver 70 disposed in disposed position P1 is receiving the radio wave from the first wireless transmission terminal 101 at a radio wave strength smaller than the first reference strength. For that reason, the reception data including the first position estimation data are transmitted from the wireless receivers 70 with receiver IDs B, C, and D to the management computer 60 using the data transmission line 52, but a transmission of the reception data from the wireless receiver 70 with receiver ID A does not take place. As a result, the amount of data transmission from the wireless receiver 70 with receiver ID A is reduced. Although only four wireless receivers 70 are shown in FIG. 6, in an indoor space where twenty wireless receivers 70 are installed as shown in FIG. 7 there are also cases where a reduction in the amount of data transmission equivalent to seventeen receivers, for example, takes place.

In the same way, the wireless receivers 70 disposed in disposed positions P2, P3, and P4 are receiving the radio wave from the second wireless transmission terminal 102 at radio wave strengths equal to or greater than the second reference strength. However, the wireless receiver 70 disposed in disposed position P1 is receiving the radio wave from the wireless transmission terminal 102 at a radio wave strength smaller than the second reference strength. For that reason, the reception data including the second position estimation data are transmitted from the wireless receivers 70 with receiver IDs B, C, and D to the management computer 60 using the data transmission line 52, but a transmission of the reception data from the wireless receiver 70 with receiver ID A does not take place. If there were only one type of threshold value and the second reference strength had been set to the same value as the first reference strength, the reception data including the second position estimation data would also no longer be transmitted from the wireless receivers 70 with receiver IDs B, C, and D to the management computer 60. Conversely, if the first reference strength had been set to the same value as the second reference strength, a transmission of the reception data from the wireless receiver 70 with receiver ID A and also the other numerous wireless receivers 70 would take place, leading to an increase in the amount of data transmission.

(5) Responding to a Sudden Fluctuation in Radio Wave Strength

A response in a case where the radio wave strength has suddenly fluctuated will be described using FIG. 7 and FIG. 8. Curved line Ln5 shown in FIG. 7 represents the radio wave strength at time T10 when, for example, the first wireless transmission terminal 101 is in position P12. In the state represented by curved line Ln5, the first position estimation data are being transmitted from the wireless receivers 70 with receiver IDs H, L, and P. There are cases where the radio wave strength suddenly drops as a result of the first wireless transmission terminal 101 being put into a briefcase of the terminal carrier, for example. Curved line Ln6 shown in FIG. 7 represents a state in which the radio wave strength of the first wireless transmission terminal 101 has dropped at time T11 while the first wireless transmission terminal 101 remains in the same position P12. In a case where the radio wave strength has dropped to the radio wave strength represented by curved line Ln6, the entire curved line Ln6 becomes positioned below straight line SH3 representing the first reference strength that was set in the first determination period (step ST1), so the first position estimation data end up not being transmitted from any of the wireless receivers 70 with receiver IDs D, H, L, P, and T despite being in the operation period (step ST3).

Therefore, in a case where none of the wireless receivers 70 with receiver IDs D, H, L, P, and T receive the reception data at a radio wave having a strength equal to or greater than the first reference strength from the first wireless transmission terminal 101 even after a predetermined grace period has passed, the determination period/operation period switching component 66a of the management computer 60 judges that a sudden fluctuation in the radio wave strength has occurred in the first wireless transmission terminal 101 with terminal ID a (step ST4) and switches from the operation period to the determination period in regard to the first wireless transmission terminal 101.

When this switching takes place, reception of the radio wave from the first wireless transmission terminal 101 takes place irrespective of the first reference strength that had already been set, so after the determination period/operation period switching component 66a has moved to the determination period (step ST1), the first position estimation data relating to the radio wave received from the first wireless transmission terminal 101 are sent from all the wireless receivers 70 with receiver IDs D, H, L, P, and T shown in FIG. 7 to the management computer 60. Thereafter, the management computer 60 performs processing, and when determination period/operation period switching component 66a goes from step ST1 via step ST2 to step ST3, a new first reference strength suited to curved line Ln6 is set. The newly set first reference strength is smaller than the value of straight line SH3. As a result, even in the case of a radio wave strength such as in the case of curved line Ln6, the first position estimation data come to be transmitted from the wireless receivers 70 with receiver IDs H, L, and P in the same way as before the occurrence of the sudden fluctuation.

(6) Transmission of Reference Strength Data to Wireless Receivers

Methods of transmitting the first reference strength and the second reference strength that have been decided by the management computer 60 in the way described above will be described using FIG. 9 to FIG. 11. The foregoing description takes as an example a case where, as shown in FIG. 9, the first reference strength and the second reference strength are transmitted together with the terminal IDs of the first wireless transmission terminal 101 and the second wireless transmission terminal 102 from the management computer 60 to all the wireless receivers 70 after the first reference strength and the second reference strength have been decided by the management computer 60 and before the determination period/operation period switching component 66a moves to the operation period in FIG. 8 (before proceeding from step ST2 to step ST3). The reference strength data transmission method shown in FIG. 9 can be considered an appropriate data transmission method because, in a case where the indoor space is relatively small such as in the case of the bookstore 200 shown in FIG. 5, the potential for any of the wireless receivers 70 inside the bookstore 200 to be positioned in the neighborhood of the first wireless transmission terminal 101 and the second wireless transmission terminal 102 is high.

Figure 10:
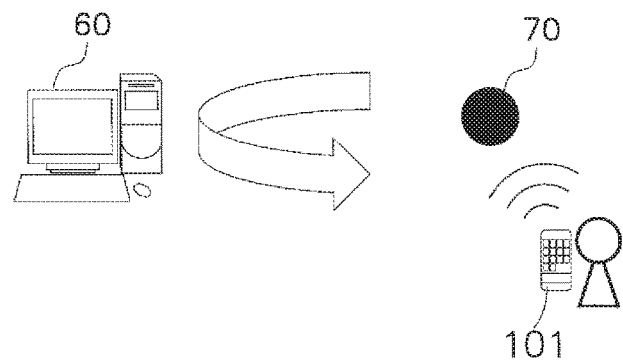
FIG. 10 is a conceptual diagram for describing another example of a method of transmitting the first reference strength and the second reference strength that have been decided by the management computer.

However, in a case where the indoor space is spacious, such as in the case of a shopping mall, and there is a greater number of wireless transmission terminals, the amount of data transmission becomes enormous if the management computer 60 transmits the data en bloc to all the wireless receivers 70, and a circumstance arises where the management computer 60 transmits the data even to wireless receivers 70 with little potential to be involved with the first wireless transmission terminal 101 and/or the second wireless transmission terminal 102. Therefore, as shown in FIG. 10, the positioning system 10 can also be configured in such a way that, for example, when the first wireless transmission terminal 101 comes near a wireless receiver 70 and that wireless receiver 70 receives the radio wave from the first wireless transmission terminal 101, the wireless receiver 70 queries the management computer 60. The management computer 60 transmits the first reference strength to only the wireless receiver 70 responsible for the query or to a plurality of wireless receivers 70 in a neighboring group to which that wireless receiver 70 belongs. In a case where the positioning system 10 is configured in this way, transmission of the data to the wireless receivers 70 not responsible for the query or to the wireless receivers 70 or the groups not responsible for the query can be dispensed with, so the amount of data transmission can be suppressed. Furthermore, query conditions can also be set so as to not carelessly increase the number of queries, such as querying in regard to a wireless transmission terminal with a terminal ID whose radio wave has not been received within a predetermined amount of time in the past, or querying after a predetermined amount of time has passed since the previous query, or providing an effective period and querying in a case where the effective period has passed.

Figure 11:
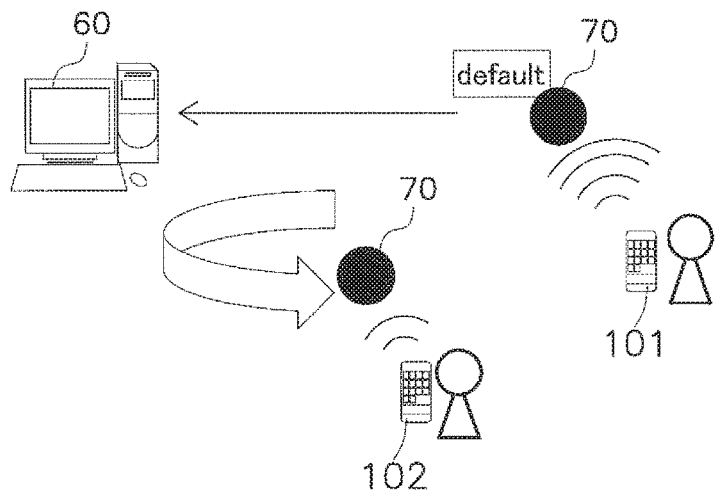
FIG. 11 is a conceptual diagram for describing another example of a method of transmitting the first reference strength and the second reference strength that have been decided by the management computer.

Furthermore, the positioning system 10 can also be configured in such a way that, rather than setting reference strengths with respect to all the wireless transmission terminals, a relative high default value, for example, is set as the reference strength, and, as shown in FIG. 11, with respect to the first wireless transmission terminal 101 whose radio wave strength is high, for example, the default value is used as the first reference strength without querying the management computer 60, and with respect to the second wireless transmission terminal 102 whose radio wave strength is lower than the threshold value, the management computer 60 is queried. In this case, in regard to a wireless transmission terminal having a high radio wave strength, data transmission for setting the reference strength in the wireless receivers 70 can be dispensed with.

Second Embodiment (7) Overview of Positioning System

In the first embodiment a case was described where the reference strength storage components 71 of the plural wireless receivers 70 store the first reference strength and the second reference strength that are different for each of the first wireless transmission terminal 101 and the second wireless transmission terminal 102 whose terminal IDs are different, but in a second embodiment the management computer 60 stores the first reference strength and the second reference strength in the reference strength memory area 64c, and the reference strength storage components 71 of the wireless receivers 70 store, as a common reference strength, a threshold value between the first reference strength and the second reference strength. Additionally, the wireless receivers 70 perform data filtering by ensuring that they transmit only the reception data including a radio wave strength higher than the common reference strength, and the management computer 60 reduces its computational load by ensuring that it uses for position estimation computation only the first position estimation data and the second position estimation data including radio wave strengths higher than the first reference strength and the second reference strength.

Figure 12:
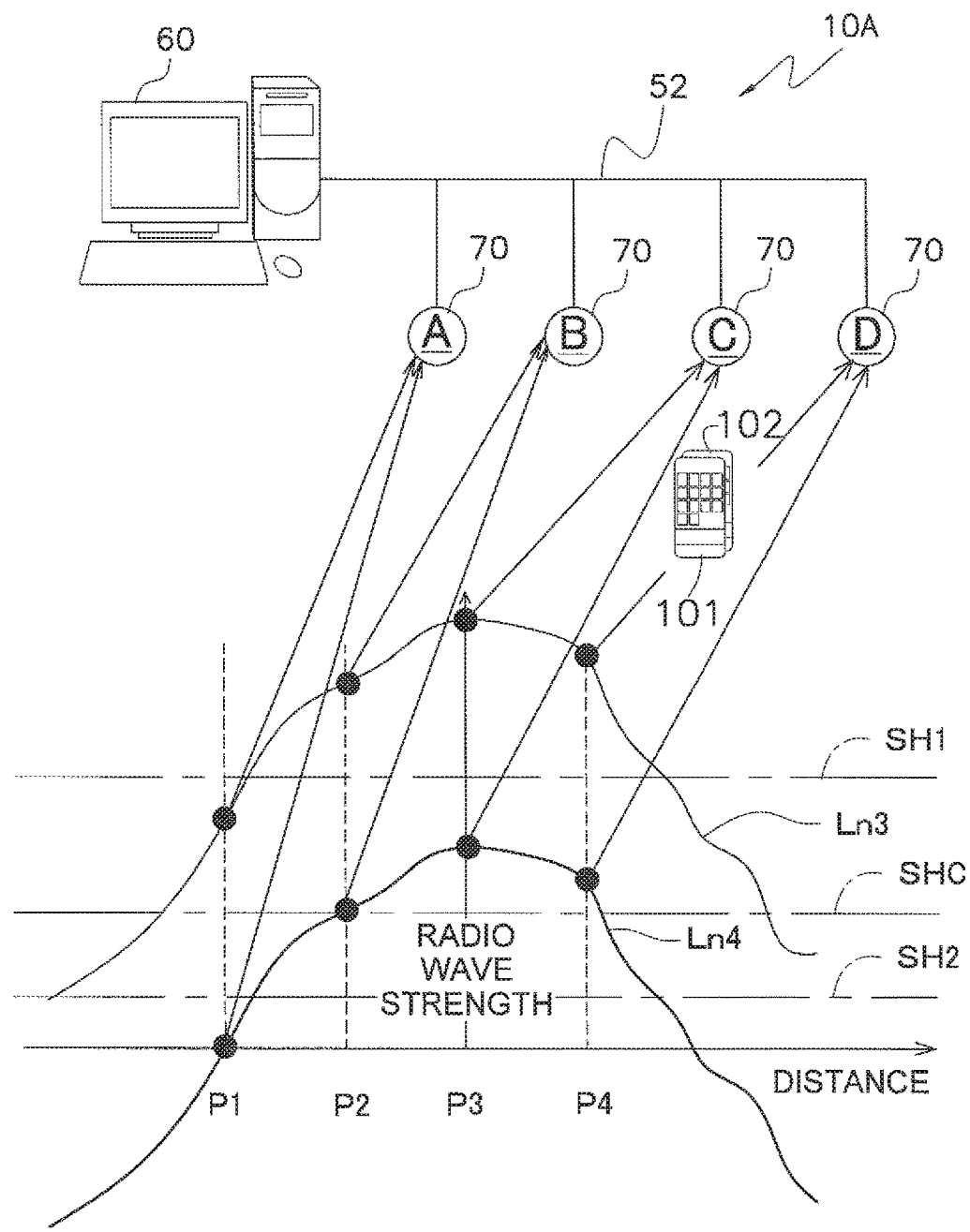
FIG. 12 is a conceptual diagram for describing data transmission using a common reference strength in the operation period and data processing using the first reference strength and the second reference strength by the management computer.

FIG. 12 is a conceptual diagram for describing data transmission using the common reference strength in the operation period and data processing using the first reference strength and the second reference strength by the management computer 60. Description will be given supposing that the state of the first wireless transmission terminal 101 and the second wireless transmission terminal 102 as well as the radio waves they transmit in FIG. 12 is the same as the state shown in FIG. 6.

The radio wave strengths of the radio wave of the second wireless transmission terminal 102 received by the wireless receivers 70 with receiver IDs A and B are smaller than straight line SHC representing the common reference strength. Consequently, compared to the circumstance of the first embodiment shown in FIG. 6, the number of the wireless receivers 70 that transmit useful second position estimation data decreases, but even in the circumstance of the second embodiment shown in FIG. 12 the transmission of the second position estimation data can be received from the wireless receivers 70 with receiver IDs C and D.

Furthermore, regarding the first wireless transmission terminal 101, compared to the circumstance of the first embodiment shown in FIG. 6, the circumstance of the second embodiment shown in FIG. 12 is such that the number of wireless receivers 70 that send the first position estimation data increases. The wireless receiver responsible for the increase is the wireless receiver 70 with receiver ID A, so if anything it can be considered that there has been an increase in the amount of unnecessary data communication. In this way, compared to the positioning system 10 of the first embodiment, the positioning system 10 of the second embodiment has the disadvantage that the transmission of useful second position estimation data decreases while the transmission of useful first position estimation data increases. However, in the case of the second embodiment, there is effect of reducing the amount of data transmission by dispensing with sending and receiving, between the management computer 60 and the plural wireless receivers 70, data relating to the first reference strength and the second reference strength.

In this connection, with respect to the position estimation data that have been transmitted from the plural wireless receivers 70, the position estimation data extracting component 66c of the management computer 60 performs filtering based on the first reference strength and the second reference strength. As a result, the data that have been transmitted from the wireless receiver 70 with receiver ID A are not used for position estimation regarding the first wireless transmission terminal 101, and the computational load for position estimation in the management computer 60 is reduced.

It should be noted that in the second embodiment also the calculation of the first reference strength and the second reference strength can be performed using the same approach in the determination period in the same way as in the first embodiment, so description is omitted.

Third Embodiment (8) Overview of Positioning System

In the first embodiment and the second embodiment, even when the radio wave strengths of the radio waves received from the first wireless transmission terminal 101 and the second wireless transmission terminal 102 are mutually different, the computational load for position estimation is reduced by setting the first reference strength and the second reference strength suited to the magnitudes of the radio wave strengths of each. In other words, in both the first embodiment and the second embodiment, the reception data of all the wireless receivers 70 are screened using threshold values such as the first reference strength and the second reference strength, and just the reception data obtained from some of the wireless receivers 70 are selected for use as the first position estimation data and the second position estimation data.

Figure 13:
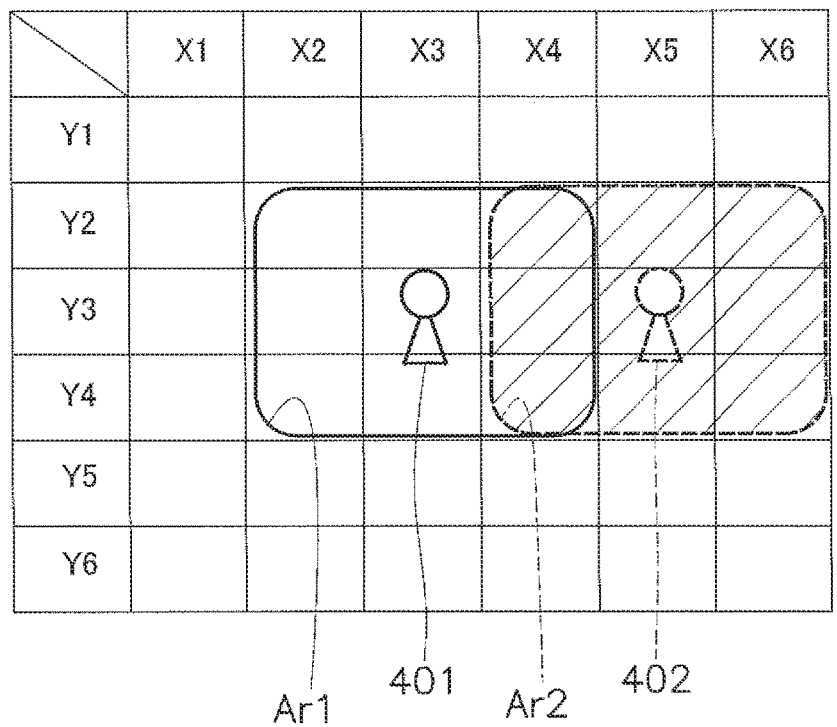
FIG. 13 is a conceptual diagram for describing a positioning system pertaining to a third embodiment.
Figure 14:
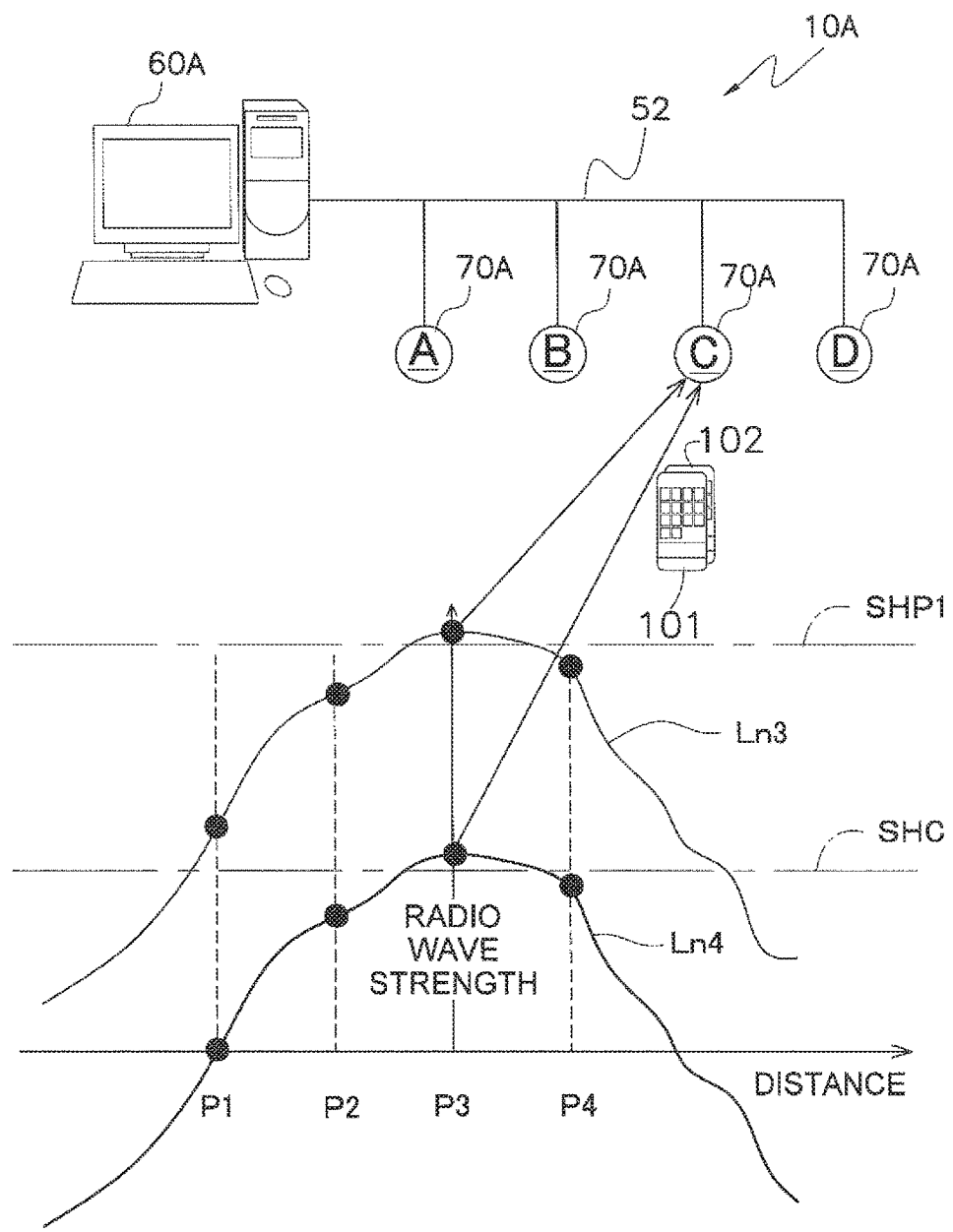
FIG. 14 is a conceptual diagram for describing data transmission using peak strengths in the operation period.
Figure 15:
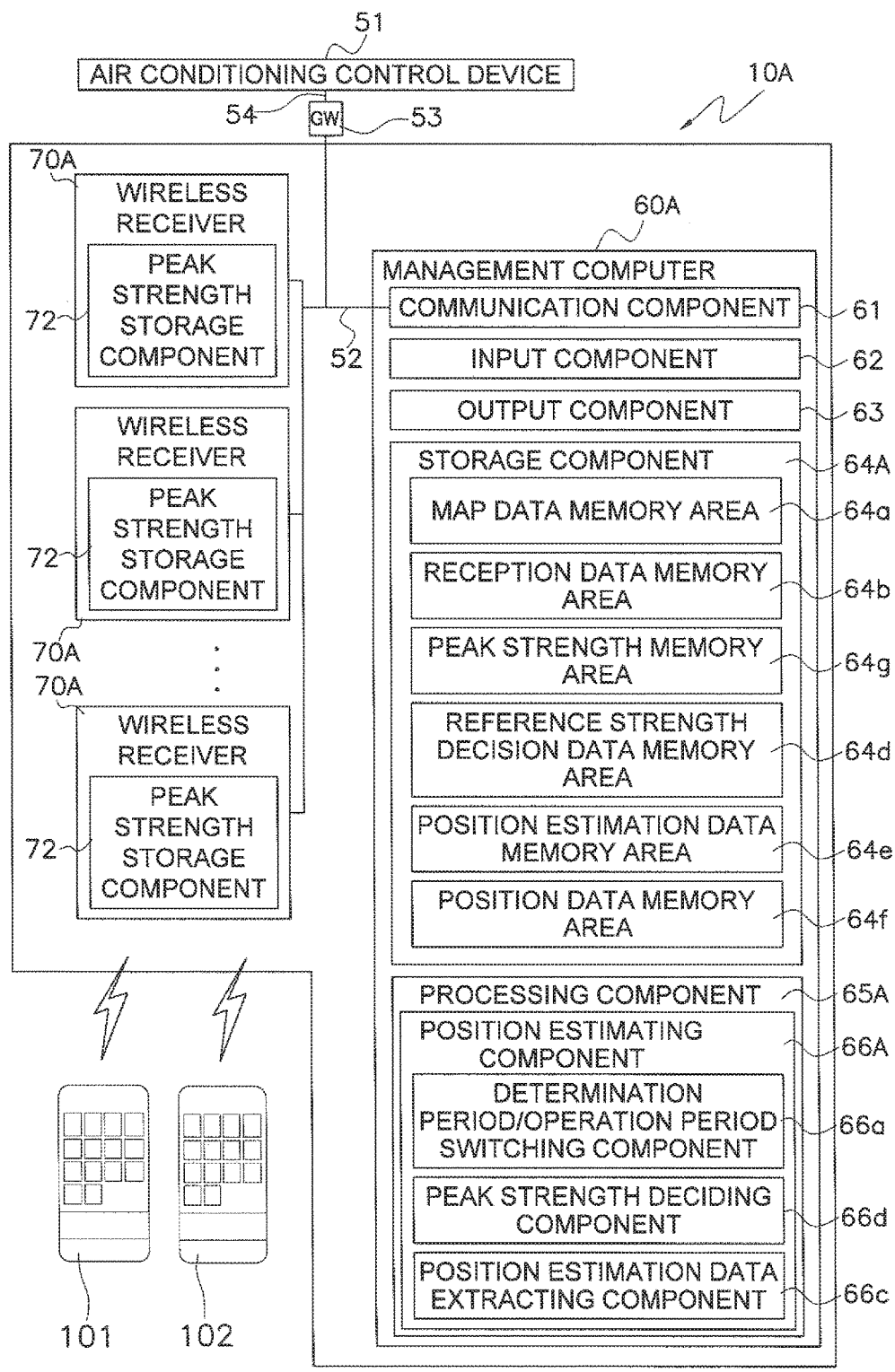
FIG. 15 is a block diagram for describing an overview of the configuration of a positioning system pertaining to the third embodiment.

In contrast to this, in a third embodiment, the targets from which to accept the reception data for position estimation are selected by designating ranges in planar geographical locations from among all wireless receivers 70A. FIG. 13 is a conceptual diagram showing an example of range setting in the third embodiment. FIG. 14 is a conceptual diagram for describing data transmission using peak strengths in the operation period. Furthermore, FIG. 15 is a block diagram showing an example of the configuration of a positioning system of the third embodiment. In FIG. 15 the same reference signs are assigned to things that are the same as the ones in FIG. 2, and description will be omitted.

Symbol 401 shown in FIG. 13 represents the place where the radio wave strength of the radio wave received from the first wireless transmission terminal 101 was the highest, and symbol 402 represents the place where the radio wave strength of the radio wave received from the second wireless transmission terminal 102 was the highest. A first area Ar1 around symbol 401 is a region where the wireless receivers 70 that collect the first position estimation data are disposed, and a second area Ar2 around symbol 402 is a region where the wireless receivers 70 that collect the second position estimation data are disposed. These areas can be set by limiting them using coordinates or distance from the wireless receiver 70A in the center on the map data described using FIG. 5 or limiting them using a condition such as the wireless receivers 70A adjacent to the wireless receiver 70 in the center.

In order to identify the positions of the symbols 401 and 402, for example, peak strengths SHP1 and SHP2, which are threshold values for identifying the wireless receiver 70A at which the radio wave strength is the largest such as shown in FIG. 14, are set in the determination period. The peak strengths SHP1 and SHP2 can be set simply by using the same method as the one with which the first reference strength and the second reference strength were set and varying the values of each so as to make them suitable for peak identification. For that reason, here, description regarding the method of setting the peak strengths SHP1 and SHP2 will be omitted. The peak strengths are stored in peak strength storage components 72 of the wireless receivers 70A shown in FIG. 15, for example.

In the case of FIG. 14, the fact that the first wireless transmission terminal 101 and the second wireless transmission terminal 102 are in the neighborhood of the wireless receiver 70A with receiver ID C can be detected by the wireless receivers 70A themselves using the peak strength storage components 72. For example, if the condition for setting the first area Ar1 and the second area Ar2 extends to even the wireless receivers 70A adjacent to the wireless receiver 70A at which the radio wave strength is the largest, then in the case of FIG. 14 the ranges for the first area Ar1 and the second area Ar2 extending to even the wireless receivers 70 with receiver IDs B and D become regions where there are wireless receivers 70A that should transmit the reception data. For example, as shown in FIG. 1, the wireless receivers 70A adjacent to each other are connected to each other by the data transmission line 52, so the positioning system 10A may also be configured in such a way that the wireless receiver 70A with receiver ID C commands the wireless receivers 70A with receiver IDs B and D to transmit the reception data.

In FIG. 14 there are just two adjacent wireless receivers 70A-those with receiver IDs B and D—but in a case where, as shown in FIG. 5, the wireless receivers 70A are disposed in planar fashion in disposed positions P1 to P20, planar ranges including the four wireless receivers adjacent to the east, adjacent to the west, adjacent to the north, and adjacent to the south can also be made to serve as the first area Ar1 and the second area Ar2. Moreover, rectangular planar spaces to which have been added the four wireless receivers adjacent to the northeast, adjacent to the southeast, adjacent to the northwest, and adjacent to the southwest can also be made to serve as the first area Ar1 and the second area Ar2. For example, coordinates X3, Y2 adjacent to X3, Y3 in FIG. 13 can be regarded as corresponding to adjacent to the north.

The positioning system 10A of the third embodiment differs from the positioning system 10 of the first embodiment in that the wireless receivers 70A are equipped with the peak strength storage components 72 instead of the reference strength storage components 71 and in that the management computer 60A is equipped with a peak strength memory area 64g instead of the reference strength memory area 64c and is equipped with a peak strength deciding component 66d instead of the reference strength deciding component 66b. These functions are simply for deciding and storing the peak strengths for the first wireless transmission terminal 101 and the second wireless transmission terminal 102 instead of deciding and storing the first reference strength and the second reference strength.

In the positioning system 10A of the third embodiment, compared to the positioning system 10 of the first embodiment, the number of the wireless receivers 70A in the first area Ar1 and the second area Ar2 are determined irrespective of radio wave strength, so the effect of reducing a certain amount of communication can be expected. Furthermore, in the management computer 60 also, the wireless receivers 70A situated outside the first area Ar1 and the second area Ar2 can be excluded from the computational targets for the position estimation performed by the position estimating component 66, and the computational load can be reduced. It should be noted for the sake of precaution that the position estimation performed by the position estimating component 66 is not an estimation with low accuracy where the first wireless transmission terminal 101 and the second wireless transmission terminal 102 are in the neighborhood of the wireless receiver 70A of receiver ID C, but is an estimation with high accuracy performed using the position estimation data of the wireless receiver 70A with receiver ID C and the wireless receivers 70A around that wireless receiver 70A with receiver ID C.

It should be noted that the setting of the first area Ar1 and the second area Ar2 may be performed by the wireless receivers 70A as described above or may be performed by the position estimating component 66A of the management computer 60A.

(9) Characteristics (9-1)

As described above, the position estimating component 66 of the management computer 60 or 60A estimates the positions of the first wireless transmission terminal 101 and the second wireless transmission terminal 102 on the basis of the disposed positions of the plural wireless receivers 70 or 70A using the first position estimation data and the second position estimation data, and the range given by the first reference strength (the value indicated by straight line SH1) or the first area Ar1 is a first set region for acquiring the first position estimation data and the range given by the second reference strength (the value indicated by straight line SH2) or the second area Ar2 is a second set region for acquiring the second position estimation data. In this way, the first set region suited to the first wireless transmission terminal 101 and the second set region suited to the second wireless transmission terminal 102 are distinctively provided as ranges in which to acquire the first position estimation data and the first position estimation data, so a drop in the position-fixing accuracy of the first wireless transmission terminal 101 and the second wireless transmission terminal 102 can be suppressed. Furthermore, at least one of the management computer 60 or 60A and the wireless receivers 70 or 70A of the positioning system 10 or 10A can appropriately narrow down the first position estimation data and the second position estimation data for the first wireless transmission terminal 101 and the second wireless transmission terminal 102 by means of the first set region and the second set region. As a result, an increase in the data amount associated with an increase in the number of wireless transmission terminals is suppressed so that the computational load is reduced.

(9-2)

Usually in a case where the radio wave strengths of the first wireless transmission terminal 101 and the second wireless transmission terminal 102 are different, if the first set region and the second set region are set in common using a reference strength suited to the wireless transmission terminal with the higher radio wave strength, the position-fixing accuracy of the wireless transmission terminal with the lower radio wave strength tends to become poor, and if the first set region and the second set region are set in common using a reference strength suited to the wireless transmission terminal with the lower radio wave strength, the computational load tends to increase because of the increase in the data amount of the wireless transmission terminal with the higher radio wave strength. To address this, in the positioning system 10, by setting the first set region to a range where the radio wave strength is equal to or greater than the first reference strength, setting the second set region to a range where the radio wave strength is equal to or greater than the second reference strength, and setting the first reference strength and the second reference strength suited to each of the first wireless transmission terminal 101 and the second wireless transmission terminal 102, a reduction of the computational load and a suppressing of a drop in the position-fixing accuracy can be simultaneously achieved.

(9-3)

Figure 8:
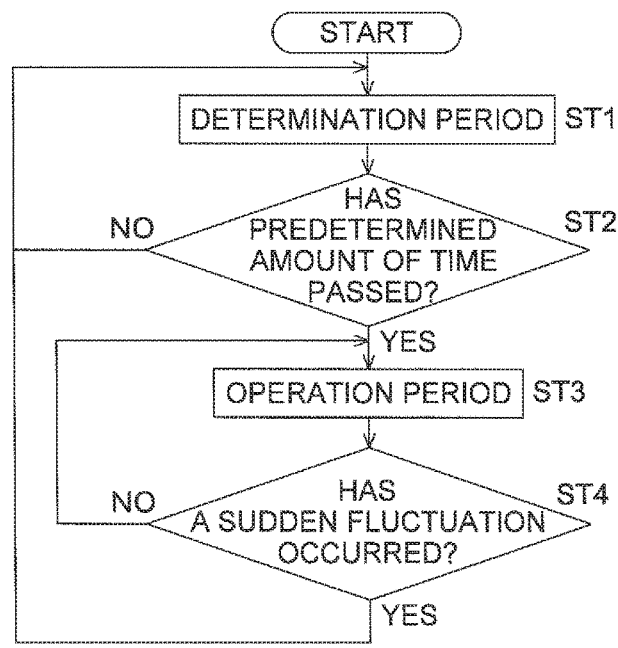
FIG. 8 is a flowchart for describing a response in a case where the radio wave strength has suddenly fluctuated.
Figure 9:
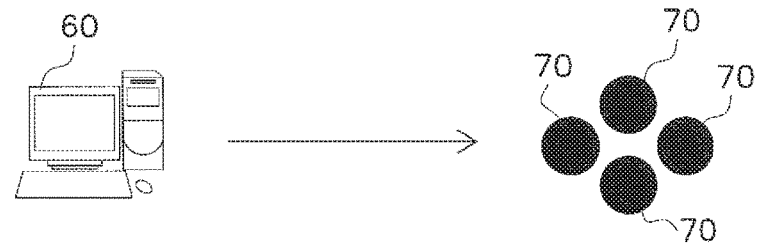
FIG. 9 is a conceptual diagram for describing an example of a method of transmitting the first reference strength and the second reference strength that have been decided by a management computer.

The first reference strength and the second reference strength are dynamically changed taking into account the occurrence of a sudden fluctuation such as in step ST4 as was described using FIG. 8, for example, so it becomes possible to appropriately respond to changes in the radio wave strengths of the first wireless transmission terminal 101 and the second wireless transmission terminal 102 that occur because of a change in circumstance such as a user having put the first wireless transmission terminal 101 or the second wireless transmission terminal 102 in a bag, for example. As a result, the position-fixing accuracy becomes stable.

(9-4)

The management computers 60 and 60A are equipped with the determination period/operation period switching component 66a, and the determination period for setting the first reference strength and the second reference strength is set before the operation period as was described using FIG. 8. As a result, it becomes easy to accurately set the first reference strength and the second reference strength. Additionally, because the first reference strength and the second reference strength are accurately set, an increase in the data amount is suppressed.

(9-5)

The positioning system 10A sets the first set region and the second set region using geographical locations—the first area Ar1 and the second area Ar2 in the example in FIG. 13—centered on the wireless receivers 70A at which the radio wave strengths of the radio waves received from the first wireless transmission terminal 101 and the second wireless transmission terminal 102 are the strongest out of the plural wireless receivers 70A, so the data of the wireless receivers 70A in areas outside these geographical locations become discarded, but while the drop in the position-fixing accuracy is small even without using communication data whose radio wave strength is weak over a long distance, the computational load can be reduced by significantly leaving out communication data whose radio wave strength is weak. Furthermore, it becomes difficult for the positioning system 10A to lose track of the first wireless transmission terminal 101 and the second wireless transmission terminal 102 when the radio wave strengths of the first wireless transmission terminal 101 and the second wireless transmission terminal 102 have fluctuated, and the positioning system 10A can have high adaptability with respect to fluctuations in the radio wave strengths.

(9-6)

In the positioning systems 10 and 10A, the detection of the first wireless transmission terminal 101 and the second wireless transmission terminal 102 is not obstructed for the purpose of setting the first set region and the second set region because the point in time when the first set region and the second set region are set is after the first wireless transmission terminal 101 and the second wireless transmission terminal 102 have been detected, so the certainty of the detection of the first wireless transmission terminal 101 and the second wireless transmission terminal 102 is improved. For example, in a state in which a threshold value has been set with respect to radio wave strength beforehand, in a case where the radio wave strength of at least one of the first wireless transmission terminal 101 and the second wireless transmission terminal 102 is equal to or less than the threshold value, the one whose radio wave strength is equal to or less than the threshold value ends up not being detected, but in the case of the positioning systems 10 and 10A, a threshold value is not provided in the determination period, so it becomes easier to avoid a situation where the first wireless transmission terminal 101 and the second wireless transmission terminal 102 are not detected. As a result, the stability of the system is improved.

(9-7)

As was described in the second embodiment, the common reference strength is set beforehand in the reference strength storage components 71 of the wireless receivers 70, for example, and the position estimating component 66 does not have to set in the wireless receivers 70 the first reference strength and the second reference strength that are threshold values, so it becomes easier to simplify operations with respect to the wireless receivers 70.

(9-8)

Only a limited number of the plural wireless receivers 70 or 70A transmit the first position estimation data and the second position estimation data to the position estimating component 66 or 66A, so reception data not needed for the position estimation can be prevented from being transmitted from the plural wireless receivers 70 or 70A to the position estimating component 66 or 66A. As a result, the communication load of the positioning systems 10 and 10A is reduced.

(9-9)

The position estimating component 66 or 66A estimates the positions of the first wireless transmission terminal 101 and the second wireless transmission terminal 102 using the first position estimation data and the second position estimation data corresponding to plural times transmitted from at least two—a first wireless receiver and a second wireless receiver—out of the plural wireless receivers 70 or 70A, so movement along a straight line joining the first wireless receiver and the second wireless receiver can be estimated. For that reason, in a case where the first wireless transmission terminal 101 and the second wireless transmission terminal 102 move on a straight line, such as in the case of an aisle for example, sufficient position estimation becomes possible with a small computational load.

Fourth Embodiment

(10) Overview of Positioning System

Figure 16:
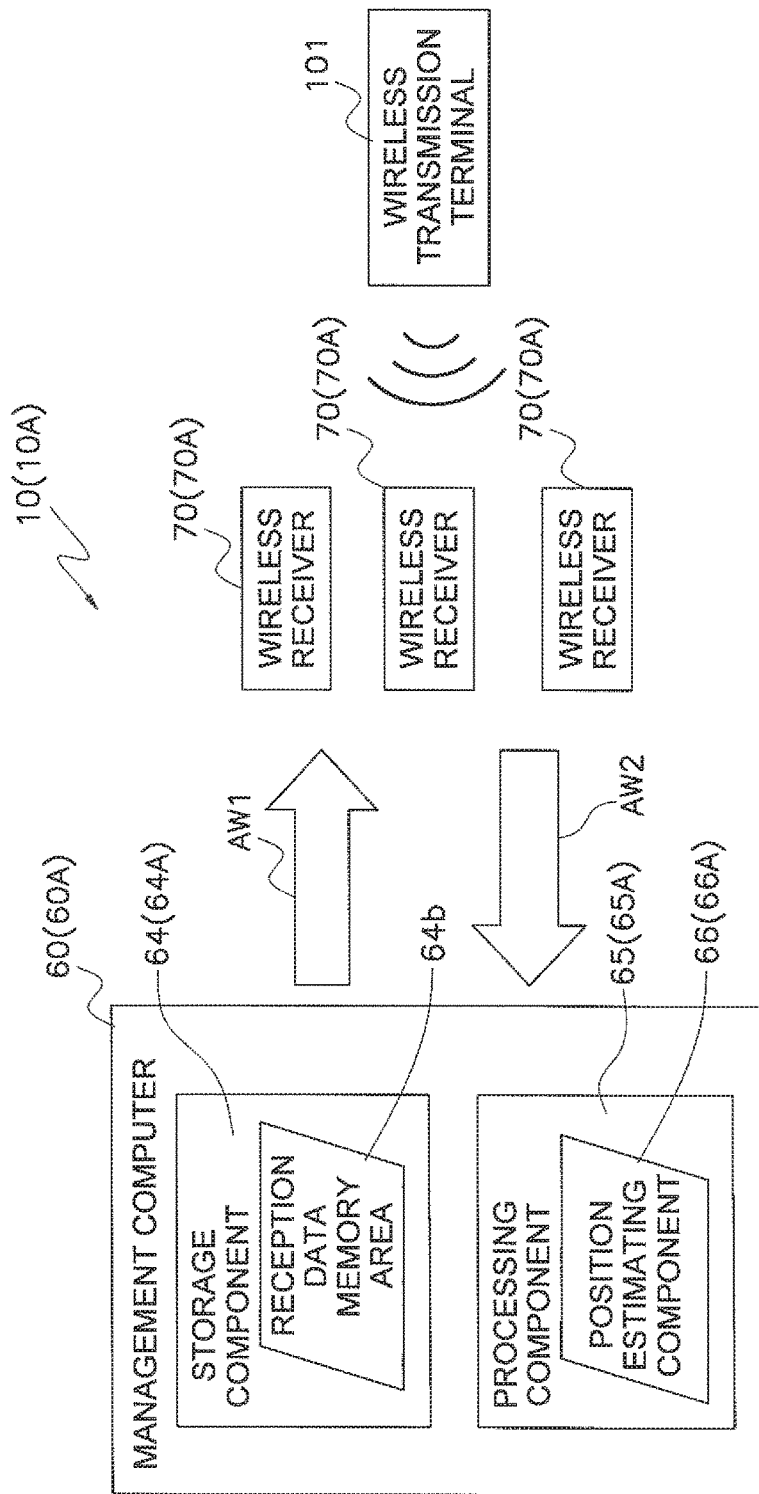
FIG. 16 is a block diagram for describing an overview of the configuration of a positioning system pertaining to a fourth embodiment.

A positioning system pertaining to a fourth embodiment of the present invention will be described using FIG. 16. The configuration of the positioning system 10 or the positioning system 10A described above can be used for the configuration of the positioning system of the fourth embodiment. In the fourth embodiment, the plural wireless receivers 70 or 70A are disposed with respect to an indoor space, detect the radio wave strength of the radio wave received from the wireless transmission terminal 101, and generate reception data including information relating to the radio wave strength. The position estimating component 66 or 66A estimates the position of the wireless transmission terminal 101 on the basis of the disposed positions of the plural wireless receivers 70 or 70A using, as position estimation data, the reception data of a radio wave strength equal to or greater than a set threshold value in the reception data generatable by the plural wireless receivers 70 or 70A.

In the positioning system 10 or 10A having the configuration described above, when the reception data satisfy a redetermination condition relating to the set threshold value, at least one of the position estimating component 66 or 66A and the plural wireless receivers 70 or 70A has the function of determining the radio wave strength of the radio wave received from the wireless transmission terminal to reset the set threshold value.

The set threshold value described in the fourth embodiment is a concept including the reference strength in each of the above embodiments. For example, the first reference strength can be handled in the same way as the set threshold value and reset by a method described later. In the same way, the second reference strength can be handled in the same way as the set threshold value and reset by a method described later. Furthermore, the set threshold value is a concept including peak strength in each of the above embodiments. Consequently, the peak strength can be handled in the same way as the set threshold value and reset by a method described later.

Figure 17:
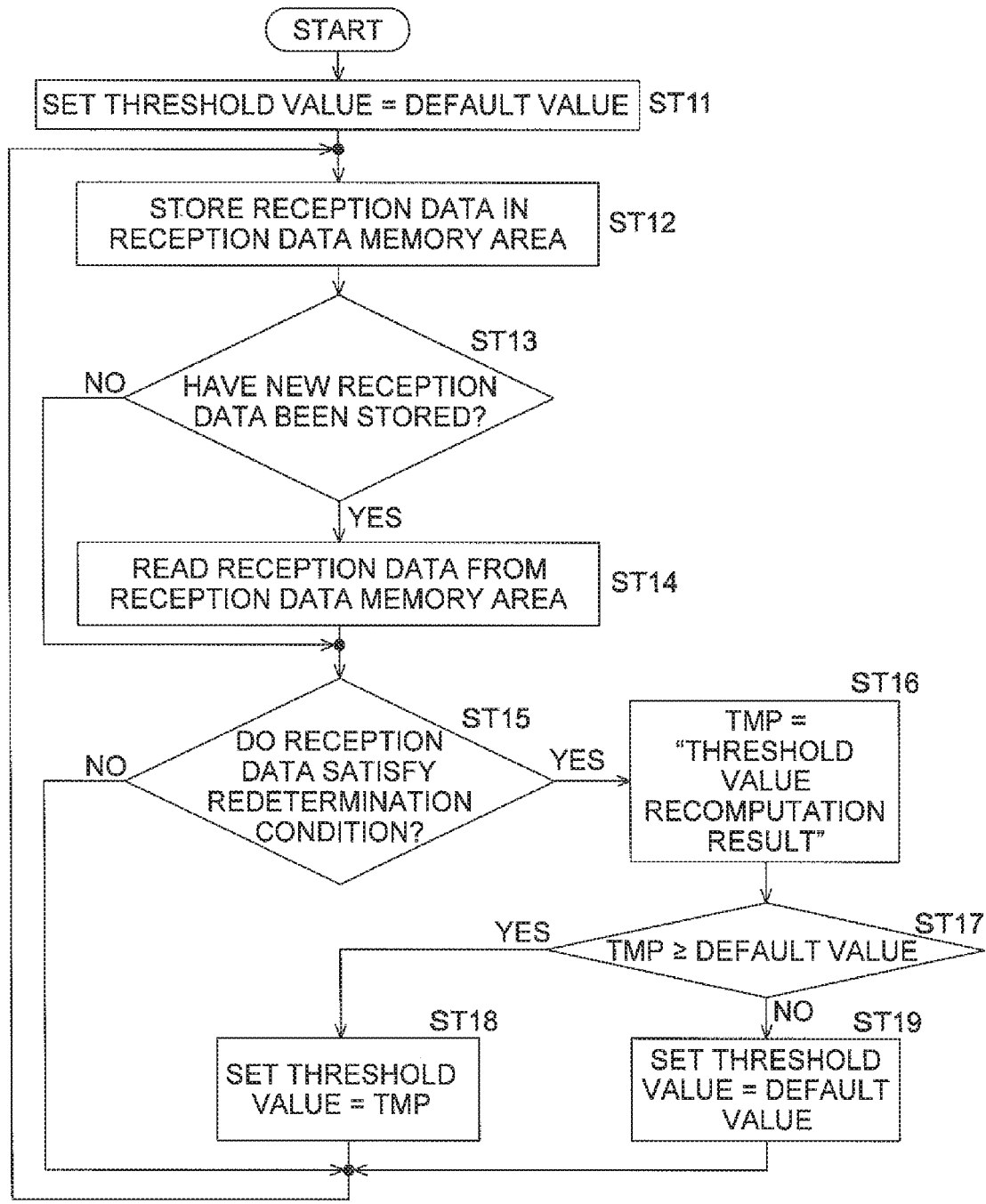
FIG. 17 is a flowchart for describing an operation for resetting a set threshold value in the fourth embodiment.

(11) Resetting of Set Threshold Value in Positioning System (11-1) Basic Operation for Resetting Next, a method of deciding the threshold value in the operation of the positioning system 10 or 10A will be described using FIG. 17. In the following description, the method of deciding the set threshold value will be described taking the positioning system 10 as an example. A first example of the method of deciding the set threshold value will be described using FIG. 16.

The position estimating component 66 acquires a default value as the threshold value (step ST11). The default value is stored in the storage component 64, for example. Then, the default value is sent as the set threshold value in the way indicated by arrow AW1, that is, from the management computer 60 to the plural wireless receivers 70.

Reception data received at a radio wave strength equal to or greater than the set threshold value is sent in the way indicated by arrow AW2, that is, from the plural wireless receivers 70 to the management computer 60. The reception data that have been sent to the management computer 60 are stored in the reception data memory area 64b (step ST12). The position estimating component 66 monitors the reception data in the reception data memory area 64b and judges whether or not there are newly stored reception data (step ST13).

If there are newly stored reception data (the "Yes" route in step ST13), the position estimating component 66 reads the newly stored reception data from the reception data memory area 64b (step ST14) and uses the newly stored reception data to determine whether or not the newly stored reception data satisfy a redetermination condition (step ST15). The redetermination condition will be described later. If there are no newly stored reception data (the "No" route in step ST13), the position estimating component 66 determines whether or not the reception data satisfy the redetermination condition from the circumstance up until that point on the premise that there are no newly stored reception data (step ST15).

In a case where the reception data satisfy the redetermination condition (the "Yes" route in step ST15), the position estimating component 66 recomputes the threshold value as a candidate value TMP for the set threshold value (step ST16). For the method of recomputing the threshold value, the same method as the one for calculating the first reference strength and the second reference strength described above, for example, can be applied. However, in a case where the position estimating component 66 has taken the "No" route in step ST13, the value of the candidate value TMP for the set threshold value becomes 0, and the value of the candidate value TMP becomes smaller than the value of the default value.

Next, the position estimating component 66 compares the candidate value TMP for the set threshold value and the default value (step ST17) and, if the candidate value TMP for the set threshold value is equal to or greater than the default value (the "Yes" route in step ST17), changes the set threshold value to the candidate value TMP (step ST18). However, when the position estimating component 66 compares the candidate value TMP for the set threshold value and the default value (step S17) and the candidate value TMP for the set threshold value is smaller than the default value (the "No" route in step ST17), the position estimating component 66 changes the set threshold value to the default value (step ST19).

(11-1-1) Start of Threshold Value Adjustment

The set threshold value is set to the default value until the wireless transmission terminal 101 enters the room and the radio wave strength of the wireless transmission terminal 101 becomes stronger. For that reason, a new storage of reception data in the reception data memory area 64*b* in step ST12 does not occur, and the position estimating component 66 waits until the radio wave strength of the wireless transmission terminal 101 becomes stronger by repeating the operation of a loop wherein it takes the "No" route in step ST13 and proceeds on the "Yes" route in step ST15 to step ST19 and then returns again to step ST12 or takes the "No" route in step ST15 and returns to step ST12. In this waiting state the set threshold value of the wireless transmission terminal 101 is set to the default value, so in relation to the wireless transmission terminal 101 the sending of unnecessary reception data from the wireless receivers 70 or 70A to the management computer 60 or 60A can be prevented.

Then, when the wireless transmission terminal 101 enters the room and the radio wave strength of the wireless transmission terminal 101 becomes stronger, a new storage of reception data in the reception data memory area 64*b* in step ST12 occurs. When this happens, the position estimating component 66 repeats the loop of step SST12→step ST13→step ST14→step ST15→step ST16→step ST17→step ST18→step SST12 so that the set threshold value is maintained at an appropriate value.

(11-1-2) End of Threshold Value Adjustment

For example, when the terminal carrier who had been carrying the wireless transmission terminal 101 goes outside and the radio wave strength becomes weaker or when the power of the wireless transmission terminal 101 is switched off so that it is no longer necessary to estimate the position of the wireless transmission terminal 101 or the position of the wireless transmission terminal 101 has become unable to be estimated, there no longer occurs a new storage of reception data in the reception data memory area 64*b* in step ST12. When this happens, the position estimating component 66 takes the loop of step SST12→step ST13→step ST15→step ST16→step ST17→step ST19→step SST12, and the set threshold value is changed to the default value. By returning the set threshold value of the wireless transmission terminal 101 to the default value, in relation to the wireless transmission terminal 101 the transmission of unnecessary reception data from the wireless receivers 70 or 70A to the management computer 60 or 60A can be prevented. It should be noted that, for example, when the terminal carrier who had been carrying the wireless transmission terminal 101 returns again to the room after having gone outside and there arises the need to estimate the position of the wireless transmission terminal 101, or when the power of the wireless transmission terminal 101 is switched back on and the position of the wireless transmission terminal 101 is able to be estimated, it is possible to appropriately set the set threshold value relating to the wireless transmission terminal 101 again by repeating the loop from step ST12 to step ST18.

Figure 18:
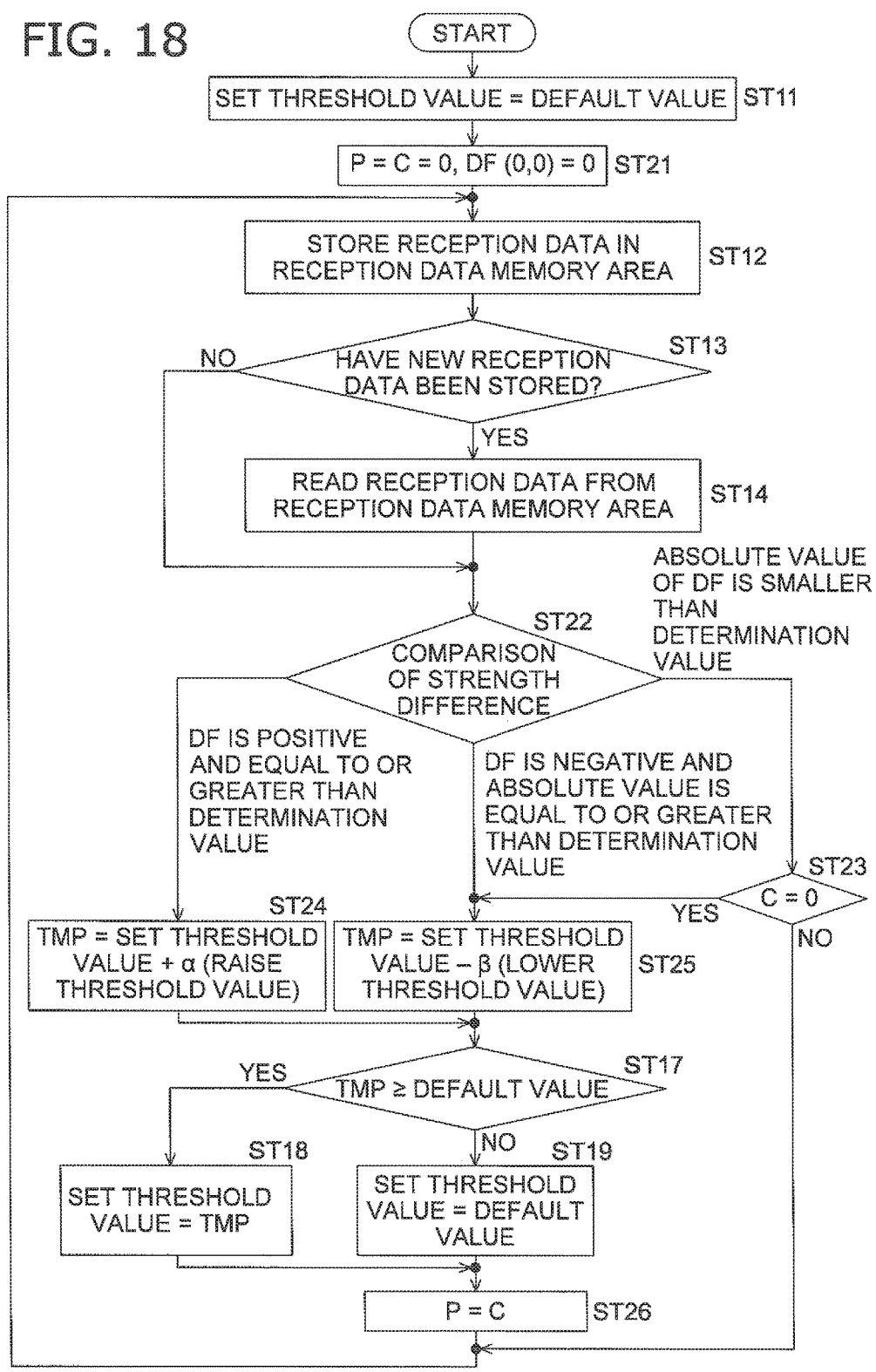
FIG. 18 is a flowchart for describing the resetting operation in a case where a resetting condition is a radio wave strength difference.

(11-2) Case where Redetermination Condition is Received Radio Wave Strength Difference Next, a case where the redetermination condition is a radio wave strength difference DF will be described using FIG. 18. In those steps in FIG. 18 having the same reference signs as those in FIG. 17, the same operations as those in the steps described in FIG. 17 are performed. It should be noted that step ST22 in FIG. 18 corresponds to step ST15 in FIG. 17 and that steps ST24 and ST25 in FIG. 18 correspond to step ST16 in FIG. 17.

First, the position estimating component 66 or 66A acquires a default value as the threshold value (step ST11) and sets a previous number of samplings P, a current number of samplings C, and a radio wave strength difference DF (0, 0) to 0. At each sampling timing, the reception data that have been sent to the management computer 60 are stored in the reception data memory area 64*b* (step ST12). From the starting point in time to until there is a storage of new reception data, the process proceeds from step ST13 to the "No" route, and the radio wave strength difference DF of the reception data between the previous P-th time and the current C-th time is compared (step ST22). In this case, there is no radio wave strength difference because DF (0, 0)=0 as it was set in step ST21. Consequently, the process proceeds to step ST23, but because C=0 the process proceeds to the "Yes" route in step ST23. Then, in step ST25 the position estimating component 66 or 66A calculates the candidate value TMP for the set threshold value a constant β from the set threshold value. At this time, the set threshold value is the default value, so TMP=(default value−β). As a result, the process proceeds from step ST17 to step ST19, and the set threshold value is again set to the default value. In step ST26 the previous P again becomes a 0-th time and the initial state is maintained.

When the radio wave strength of the wireless transmission terminal 101 becomes stronger and the position of the wireless transmission terminal 101 becomes able to be estimated, in step ST12 new reception data are stored in the reception data memory area 64*b*. Then, in the next step ST22, which takes place after step ST13 and step ST14, it is determined whether or not the radio wave strength difference DF is a positive value and equal to or greater than a determination value. As for the radio wave strength difference DF at this time, the sampling time in which reading was performed from the reception data memory area 64b is used as the current C-th time.

For example, when the largest radio wave strength out of the reception data has exceeded a value obtained by adding the determination value to the default value, the process proceeds to step ST24 where computation of the set threshold value is performed. Then, the process proceeds from step ST17 to step ST18, and the new set threshold value becomes a value obtained by adding a to the default value. Then, the data are rewritten in such a way that the current C-th time changed to the new set threshold value becomes the previous P-th time at the time of the determination for the next resetting (step ST26). To give a specific example, supposing, for example, that the determination value is 20 dbm, and that the largest radio wave strength out of the reception data that were sent from the plural wireless receivers 70 or 70A the previous P-th time is −45 dbm, and that the largest radio wave strength out of the reception data that were sent from the plural wireless receivers 70 or 70A the current C-th time is −20 dbm, ((−20)−(−45))≥20, so in this case the position estimating component 66 or 66A chooses the operational order proceeding from step ST22 to step ST24.

When the radio wave strength of the wireless transmission terminal 101 is sufficiently large compared to the default value, the position estimating component 66 or 66A repeats plural times the loop of step ST12→step ST13→step ST14→step ST22→step ST24→step ST17→step ST18→step ST26→step ST12 so that the set threshold value is set to a value of an appropriate magnitude.

Next, the circumstance after the set threshold value of the wireless transmission terminal 101 has been set to an appropriate value that is a certain extent larger than the default value in the way described above will be considered. For example, if the wireless transmission terminal 101 is put into a pocket or the like and its radio wave strength drops, then in the comparison of the radio wave strength difference DF in step ST22, DF (P, C) becomes a negative value because the radio wave strength of the current C-th time becomes smaller than the radio wave strength of the previous P-th time. Additionally, in a case where the radio wave strength difference DF (P, C) is negative and the absolute value thereof is equal to or greater than the determination value (|DF (P, C)|≥determination value), a value obtained by subtracting β from the current set threshold value is calculated for the candidate value TMP for the set threshold value (step ST25). If the candidate value TMP is larger than the default value, the candidate value TMP becomes the new set threshold value. To give a specific example, supposing, for example, that the determination value is 20 dbm, and that the largest radio wave strength out of the reception data that were sent from the plural wireless receivers 70 or 70A the previous P-th time is −20 dbm, and that the largest radio wave strength out of the reception data that were sent from the plural wireless receivers 70 or 70A the current C-th time is −40 dbm, |(−40)−(−20)|≥20, so in this case the position estimating component 66 or 66A chooses the operational order proceeding from step ST22 to step ST24.

(11-3) Setting of Determination Value

As was already described, the wireless receivers 70 or 70A are discretely disposed, so even if the strength of the radio wave sent by the wireless transmission terminal 101 is constant, when the position of the wireless transmission terminal 101 changes the distance between the wireless transmission terminal 101 and the wireless receivers 70 or 70A changes and the radio wave strength of the reception data changes. The determination value is set in consideration of the range of fluctuation of the radio wave strength, which changes in accompaniment with the movement of the terminal carrier of the wireless transmission terminal 101. For example, a wireless transmission terminal with a fixed transmission output is moved in the area in which position estimation is performed, the range of fluctuation of the radio wave strength of the reception data is found, and the determination value is set to a value larger than that range of fluctuation. By setting the determination value in this way, a situation where resetting is frequently performed because of the terminal carrier moving can be prevented.

(12) Example Modifications (12-1) 4A

Figure 19:
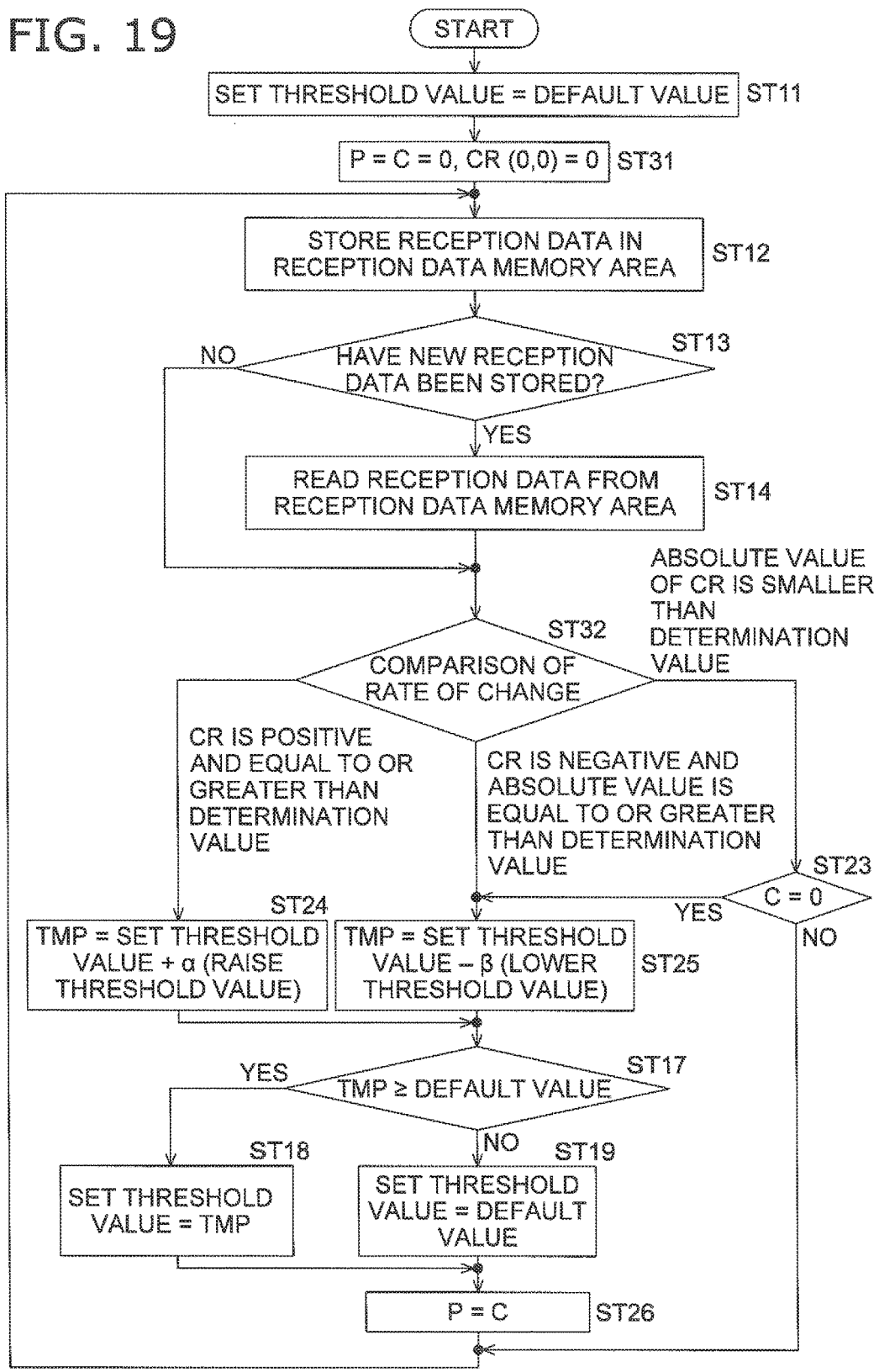
FIG. 19 is a flowchart for describing the resetting operation in a case where the resetting condition is the rate of change of the radio wave strength.

In the fourth embodiment, the case was described where the redetermination condition is the received radio wave strength difference, but the rate of change of the radio wave strength, that is to say, the rate of decrease of the received radio wave and/or the rate of increase of the received radio wave, can also be used for the redetermination condition. FIG. 19 shows an example of operations for resetting the set threshold value in a case where the rate of change of the radio wave strength is used for the redetermination condition.

Where an example modification 4A differs from the fourth embodiment is the operations of step ST31 and step ST32. In step ST31, like in step ST21 of the fourth embodiment, setting of the initial values is performed. That is to say, P and C are set so that C=P=0, and CR (0, 0), which is the rate of change of the initial radio wave strength, is set to 0.

The rate of change CR (P, C) of the radio wave strength compared in step ST31 is found in the following way, for example. When Δt denotes the sampling interval, PW(P) denotes the radio wave strength at the previous P-th time, and PW(C) denotes the radio wave strength at the current C-th time, CR (P, C)=(PW(C)−PW(P))/((C−P)×Δt). When the rate of change CR (P, C) of the radio wave strength is positive and equal to or greater than the determination value, the process proceeds to step ST24; when the rate of change CR (P, C) of the radio wave strength is negative and the absolute value thereof |CR (P, C)| is equal to or greater than the determination value, the process proceeds to step ST25; and when the absolute value |CR (P, C)| of the rate of change of the radio wave strength is smaller than the determination value, the process proceeds to step ST23. It is preferred that the determination value in this case also be set larger than the range of fluctuation of the rate of change CR that arises because of the terminal carrier of the wireless transmission terminal 101 moving.

(12-2) 4B

Figure 20:
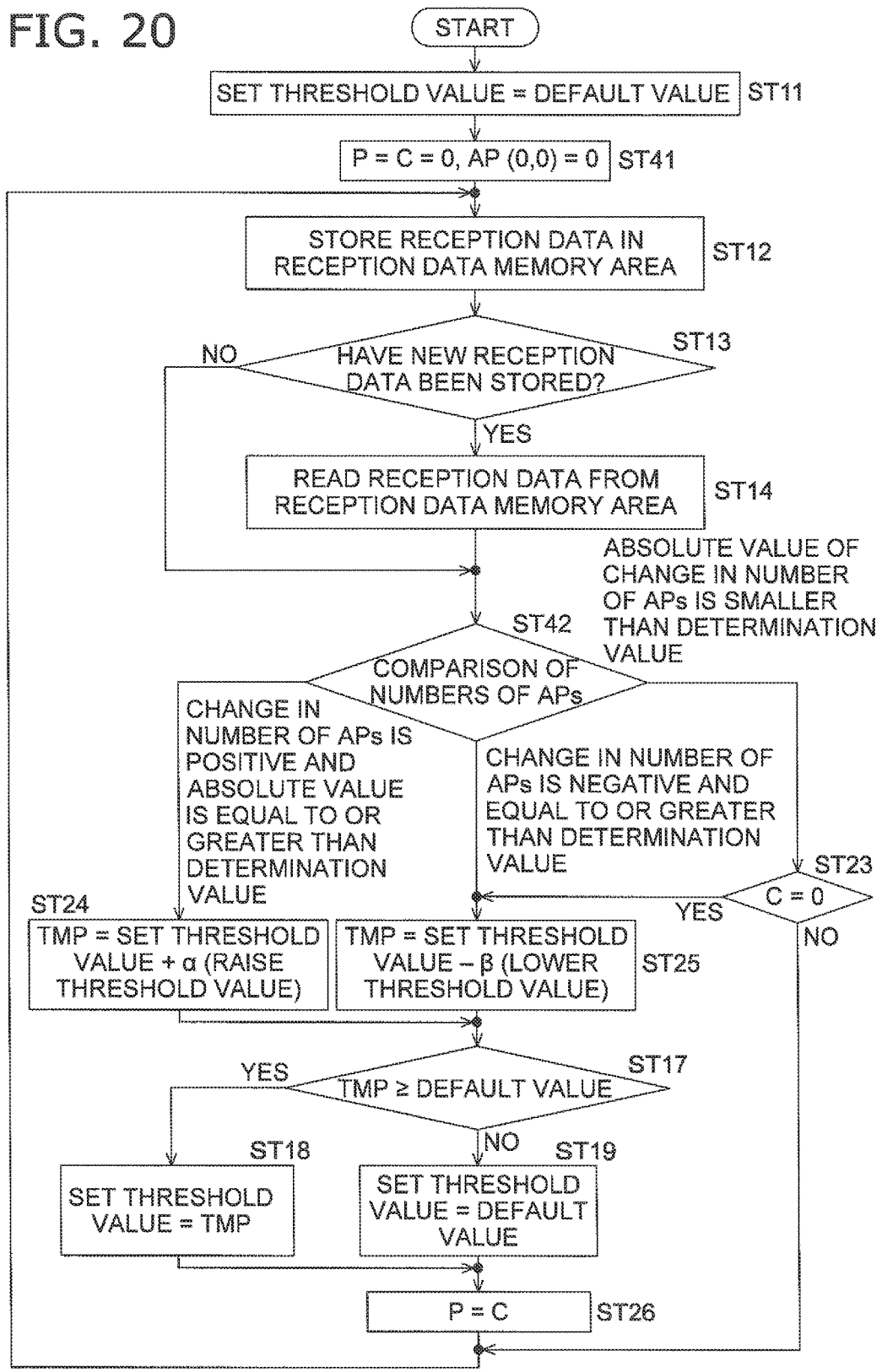
FIG. 20 is a flowchart for describing an operation in a case where the resetting condition is a change in the number of access points.

In the fourth embodiment, the radio wave strength difference DF was found by directly computing the difference between the radio wave strengths, but the radio wave strength difference can also be replaced with a different variable. The fact of the radio wave strength difference between the previous P-th time and the current C-th time being large can, for example, be replaced by the fact of the difference between the previous number of access points and the current number of access points being large. Here, the access points are the wireless receivers 70 or 70A that have sent the reception data, and the number of access points is the number of the wireless receivers 70 or 70A that have sent the reception data. FIG. 20 shows an example of operations for resetting the set threshold value in a case where the number of access points is used as the redetermination condition.

Where an example modification 4B differs from the fourth embodiment is the operations of step ST41 and step ST42. In step ST41, like in step ST21 of the fourth embodiment, setting of the initial values is performed. That is to say, P and C are set so that C=P=0, and AP (C) and AP (P), which are the initial numbers of access points, are set to 0.

The change in the number of access points compared in step ST41 is found by AP (C)−AP (P). When the change in the number of access points (AP (C)−AP (P)) is positive and equal to or greater than the determination value, the process proceeds to step ST24; when the change in the number of access points (AP (C)−AP (P)) is negative and the absolute value thereof |(AP (C)−AP (P))| is equal to or greater than the determination value, the process proceeds to step ST25; and when the absolute value |(AP (C)−AP (P))| of the change in the number of access points is smaller than the determination value, the process proceeds to step ST23. For example, let it be supposed that at the previous P-th time the reception data had been sent from ten wireless receivers 70 or 70A to the management computer 60 or 60A but at the current C-th time the reception data have been sent from only six wireless receivers 70 or 70A to the management computer 60 or 60A. Supposing, for example, that the determination value is a difference of three or more wireless receivers, in this example (AP (C)−AP (P))=(10−6)≥3 and the set threshold value is lowered by β (step ST25). It is preferred that the determination value in this case also be set larger than the range of fluctuation in the number of access points AP that arises because of the terminal carrier of the wireless transmission terminal 101 moving.

(12-3) 4C

In the fourth embodiment, the radio wave strength difference DF was found by directly computing the difference between the radio wave strengths, but the fact of the radio wave strength difference between the previous P-th time and the current C-th time being large can also be substituted by the fact of the difference between the area of the region where the access points are disposed the previous time and the area of the region where the access points are disposed the current time being large. Here, the area of the region where the access points are disposed is the area of the region including the wireless receivers 70 or 70A that have sent the reception data. For example, if two hundred wireless receivers 70 or 70A are disposed in a 3300 square meter room, supposing that the reception data have been sent from twenty wireless receivers 70 or 70A, the result of the computation is that the reception data have been sent from the wireless receivers 70 or 70A disposed in a range of about 330 square meters. However, it is not always the case that the wireless receivers 70 or 70A are disposed uniformly. Therefore, small areas may be allotted to the wireless receivers 70 or 70A in places where they are densely disposed, large areas may be allotted to the wireless receivers 70 or 70A in places where they are sparsely disposed, the areas allotted to the wireless receivers 70 or 70A that have sent the reception data may be added up, and the resetting may be performed according to how the total area has changed between the current C-th time and the previous P-th time.

Where an example modification 4C differs from the example modification 4B is the operations of step ST41 and step ST42. In step ST41, like in step ST41 of the example modification 4B, setting of the initial values is performed. That is to say, P and C are set so that C=P=0, and PD(C) and PD(P), which are the initial total areas, are set to 0.

The change in the total area compared in step ST41 is found by PD(C)−PD(P). When the change in the total area (PD(C)−PD(P)) is positive and equal to or greater than the determination value, the process proceeds to step ST24; when the change in the total area (PD(C)−PD(P)) is negative and the absolute value thereof |PD(C)−PD(P)| is equal to or greater than the determination value, the process proceeds to step ST25; and when the absolute value |PD(C)−PD(P)| of the change in the total area is smaller than the determination value, the process proceeds to step ST23. It is preferred that the determination value in this case also be set larger than the range of fluctuation of the total area PD that arises as a result of the terminal carrier of the wireless transmission terminal 101 moving.

(12-4) 4D

In the fourth embodiment, the positioning system 10 or 10A is configured in such a way that the set threshold value is reset when the resetting condition is satisfied even just after the set threshold value has been reset, but the positioning system 10 or 10A can also be configured in such a way that the grace period, in which the determination for resetting is not performed, is provided after the set threshold value has been reset. For example, the grace period can be provided by adding, to the resetting condition of step ST15 in FIG. 17, a condition where the number of samplings between the previous P-th time and the current C-th time is equal to or greater than m times. Or, the positioning system 10 or 10A can also be configured to store the transmission times of the reception data the previous P-th time and the current C-th time and compare the transmission times of the reception data. In the case of configuring the positioning system 10 or 10A in that way, supposing for example that the grace period is TB time, it suffices to subtract the transmission time TP of the reception data the previous P-th time from the transmission time TC of the reception data the current C-th time and compare that with TB. In a case where the positioning system 10 or 10A is configured in this way, resetting is performed if the condition of TC−TP≥TB is satisfied, the position estimating component 66 or 66A always proceeds to the "No" route in step ST15 if TC−TP<TB, and this can be applied even in a case where the sampling intervals of the reception data are not the same.

It is alright for this kind of grace period to always be provided, but the positioning system 10 or 10A can also be configured in such a way that the grace period is provided when a predetermined condition is satisfied. For example, the grace period can also be set in such a way that it is provided only when resetting of the set threshold value has been performed a predetermined number of times or more within a certain period. To give a specific example, the setting may be such that, for example, a 15-minute grace period is provided when resetting of the set threshold value has been performed three times or more (an example of the predetermined number of times) in ten minutes (an example of the certain period).

(12-5) 4E

Regarding the positioning system 10 or 10A of the fourth embodiment, the position estimating component 66 or 66A may also be configured so that, when resetting the set threshold value, it sets a redetermination period and lowers the set threshold value or cancels the setting of the set threshold value in regard to the wireless receivers 70 or 70A in a predetermined range including the position where the wireless transmission terminal 101 had been before the redetermination period.

For example, consider a case where one wireless receiver 70 or 70A each is disposed in thirty-six places indicated by coordinates X1 to X6 and coordinates Y1 to Y6 such as in FIG. 13 and where the largest value of the radio wave strength of the reception data the previous P-th time was −30 dbm but the largest value of the radio wave strength of the reception data the current C-th time has suddenly dropped to −50 dbm. Additionally, suppose that the positioning system 10 or 10A had identified the position of the wireless transmission terminal 101 the current C-th time as being in the position of coordinates X3, Y3.

In a case where the radio wave strength of the reception data has become weaker in this way, by temporarily lowering the set threshold value or cancelling the set threshold value, more reception data are obtained compared to a case where this kind of operation is not performed. By obtaining more reception data for the purpose of the resetting in this way, it becomes easier to set the set threshold value to an appropriate value. The period in which the set threshold value is lowered or the set threshold value is cancelled temporarily in this case is the redetermination period. However, it takes time to analyze the thirty-six sets of reception data obtained from the thirty-six wireless receivers 70 or 70A. Therefore, the set threshold value is lowered or the set threshold value is cancelled only around the coordinates X3, Y3, which is the position of the wireless transmission terminal 101 the current C-th time. For example, the set threshold value is lowered or the set threshold value is cancelled only in a range around the coordinates X3, Y3 with X coordinates of X2, X3, and X4 and Y coordinates of Y2, Y3, and Y4. By doing so, the reception data are not sent from the wireless receivers 70 or 70A situated in positions with X coordinates of X1, X5, and X6 or Y coordinates of Y1, Y5, and Y6, so the burden of the resetting by the position estimating component 66 or 66A can be reduced.

As described above, computation becomes necessary when the positioning system 10 or 10A identifies the position of the wireless transmission terminal 101 the current C-th time, so the positioning system 10 or 10A can also be configured exclude, with identifying the position, the wireless receivers 70 or 70A situated in X coordinates of X1 and X6 or in Y coordinates of Y1 and Y6 from the wireless receivers 70 or 70A that lower the set threshold value or cancel the set threshold value in the redetermination period, so that the reception data are not sent in the redetermination period from the wireless receivers 70 or 70A situated in positions with X coordinates of X1 and X6 or Y coordinates of Y1 and Y6 which are the outer periphery of the floor of the building. It should be noted that the outer periphery of the floor of the building can also be defined as sections along the walls of the building, for example, and is a region with little probability for the terminal carrier to be there.

(12-6) 4F

In the fourth embodiment, the current C-th time and the previous P-th time were compared, but it may also decide whether or not to perform the resetting by comparing the current radio wave strength and the set threshold value, for example.

(12-7) 4G

In the fourth embodiment and the example modifications thereof, the case was described where the position estimating component performs the resetting, but in a case where the plural wireless receivers 70 or 70A are connected to each other to form a network and the plural wireless receivers 70 or 70A can send data to and receive data from each other, the plural wireless receivers 70 or 70A can also be configured to perform the resetting instead of the position estimating component 66 or 66A.

(13) Characteristics (13-1)

The position estimating component 66 or 66A of the fourth embodiment and the example modifications 4A to 4F thereof uses, as position estimation data, the reception data of the radio wave strength equal to or greater than the set threshold value in the reception data generatable by the plural wireless receivers 70 or 70A. For that reason, the position estimating component 66 or 66A no longer uses, in position estimation, the reception data of the radio wave strength smaller than the set threshold value, so the reception data used for position estimation decreases, an increase in the amount of data processed by the position estimating component 66 or 66A is suppressed, and the computational load of the position estimating component 66 or 66A is reduced. When the radio wave strength of the reception data has changed to a state satisfying the redetermination condition, the position estimating component 66 or 66A resets the set threshold value to change the set threshold value to a set threshold value suited for use in the position estimation of the position estimation data. In this way, the position estimating component 66 or 66A can maintain the set threshold value at a value good for position estimation, even when the radio wave strength of the reception data changes. Because the set threshold value is maintained at a value good for position estimation, a situation where the radio wave strength drops and the positioning system 10 or 10A loses track of the wireless transmission terminal 101 can be prevented, and an increase in the load of the positioning system caused by the radio wave strength having become higher can be suppressed. Because the set threshold value is kept at a proper value, an increase in the data amount is suppressed and the computational load is reduced. It should be noted that, as was described in the example modification 4G the same effects are provided even when the plural wireless receivers 70 or 70A are configured to perform the resetting instead of the position estimating component 66 or 66A.

(13-2)

By using, as the redetermination condition, a situation where the difference between the highest radio wave strength out of the reception data sent from the wireless receivers 70 or 70A to the management computer 60 or 60A for the purpose of position estimation—that is to say, the position estimation data—and the set threshold value is equal to or greater than the determination value, when the radio wave strength changes and the set threshold value is unfit for balancing load reduction and estimation accuracy, the set threshold value can be kept at a proper value by certainly performing a determination for resetting the set threshold value. There are cases where the radio wave strength becomes larger than the set threshold value and cases where the set threshold value becomes larger than the radio wave strength, so the difference referred to here may be thought of as the absolute value of the radio wave strength difference |the radio wave strength difference DF|. It should be noted that, as was described in the example modification 4G, the same effects are provided even when the plural wireless receivers 70 or 70A are configured to perform the resetting instead of the position estimating component 66 or 66A.

(13-3)

By using, as the redetermination condition, a situation where the rate of change at which the highest radio wave strength out of the reception data sent from the wireless receivers 70 or 70A to the management computer 60 or 60A for the purpose of position estimation—that is to say, the position estimation data—changes becomes equal to or greater than the determination value, when the radio wave strength changes and the set threshold value becomes unfit for balancing the load reduction and the estimation accuracy, the symptoms thereof can also be taken into account to perform the determination for resetting the set threshold value. As a result, the resetting of the set threshold value can be performed early to keep the set threshold value at a proper value. It should be noted that, as was described in the example modification 4G, the same effects are provided even when the plural wireless receivers 70 or 70A are configured to perform the resetting instead of the position estimating component 66 or 66A.

(13-4)

In a case where at least one of the position estimating component 66 or 66A and the plural wireless receivers 70 or 70A is configured to not perform the determination for resetting the set threshold value within the predetermined grace period after having reset the set threshold value, a situation where the redetermination is frequently performed can be avoided to prevent an increase in the system load caused by frequently performing the redetermination. As a result, an increase in the system load associated with performing the redetermination can be suppressed.

(13-5)

In a case where at least one of the position estimating component 66 or 66A and the plural wireless receivers 70 or 70A is configured to set the grace period in a case where it has reset the set threshold value a predetermined number of times or more within a certain period, setting the grace period when the set threshold value has been reset a predetermined number of times or more within a certain period means, in other words, not providing the grace period when a situation where the redetermination is frequently performed is not arising. In this way, a situation where the set threshold value is not reset for a long period of time as a result of having provided the grace period can be avoided, so the occurrence of problems caused by the resetting not taking place for a long period as a result of having provided the grace period can be suppressed.

(13-6)

When the position estimating component 66 or 66A, when resetting the set threshold value, is configured to set the redetermination period and lower the set threshold value or cancel the setting of the set threshold value in regard to the wireless receivers 70 or 70A in the predetermined range including the position where the wireless transmission terminal had been before the redetermination period, even when the wireless transmission terminal 101 moves in accompaniment with the movement of the terminal carrier, the position where the wireless transmission terminal 101 is when the redetermination period has started can be included in the predetermined range envisioned from the position where the wireless transmission terminal 101 was before the redetermination period. This means that the management computer 60 or 60A does not need to receive the reception data from the wireless receivers 70 or 70A outside the predetermined range at the time of the redetermination, and data can be left out from the data for the redetermination. As a result, the computational load at the time of the redetermination can be reduced.

(13-7)

When the position estimating component 66 or 66A is configured to set the predetermined range excluding outer peripheral areas of the disposed positions of the plural wireless receivers 70 or 70A, the reception data of outer peripheral areas with little potential to be effectively utilized in the redetermination are no longer sent from the wireless receivers 70 or 70A to the management computer 60 or 60A. That is to say, the reception data of the outer peripheral areas with little potential to be effectively utilized in the redetermination can be left out at the time of the redetermination, so the computational load at the time of the redetermination can be reduced while performing an effective redetermination.

What is claimed is:

1. A positioning system that uses a radio wave strength of a radio wave received from a first wireless transmission terminal movable through a predetermined indoor space to locate a position of the first wireless transmission terminal and uses a radio wave strength of a radio wave received from a second wireless transmission terminal movable through the predetermined indoor space to locate a position of the second wireless transmission terminal, the positioning system comprising:

plural wireless receivers disposed in the predetermined indoor space, the plural wireless receivers
    detecting the radio wave strengths of the radio waves received from the first wireless transmission terminal and the second wireless transmission terminal, and
    being configured to generate reception data including information relating to the radio wave strengths; and a position estimating component estimating the positions of the first wireless transmission terminal and the second wireless transmission terminal based on positions of the plural wireless receivers using first position estimation data and second position estimation data in a limited range of the reception data generatable by the plural wireless receivers, at least one of the position estimating component and the plural wireless receivers acquiring
    the first position estimation data limited to a first set region suited to the first wireless transmission terminal from the reception data receivable in regard to the first wireless transmission terminal and
    the second position estimation data limited to a second set region suited to the second wireless transmission terminal from the reception data receivable in regard to the second wireless transmission terminal, at least one of the position estimating component and the plural wireless receivers
    setting the first set region by using, as the first position estimation data, the reception data of each received radio wave strength equal to or greater than a first reference strength and
    setting the second set region by using, as the second position estimation data, the reception data of each received radio wave strength equal to or greater than a second reference strength.

2. The positioning system according to claim 1, wherein at least one of the position estimating component and the plural wireless receivers dynamically changes the first reference strength.

3. The positioning system according to claim 1, wherein at least one of the position estimating component and the plural wireless receivers
    sets, before an operation period during which the position estimating component estimates the positions of the first wireless transmission terminal and the second wireless transmission terminal, a determination period and during the determination period determines the radio wave strengths of the radio waves received from the first wireless transmission terminal and the second wireless transmission terminal to set the first reference strength and the second reference strength.

4. The positioning system according to claim 1, wherein at least one of the position estimating component and the plural wireless receivers sets the first set region and the second set region after the first wireless transmission terminal and the second wireless transmission terminal have been detected.

5. The positioning system according to claim 1, wherein the position estimating component acquires the first position estimation data limited to the first set region and acquires the second position estimation data limited to the second set region from the reception data regarding the first wireless transmission terminal and the second wireless transmission terminal that have been transmitted from the plural wireless receivers.

6. The positioning system according to claim 1, wherein the plural wireless receivers use the first set region and the second set region that have been transmitted from the position estimating component to acquire the first position estimation data limited to the first set region and acquire the second position estimation data limited to the second set region from the reception data regarding the first wireless transmission terminal and the second wireless transmission terminal, and transmit the first position estimation data and the second position estimation data to the position estimating component.

7. The positioning system according to claim 1, wherein the plural wireless receivers include a first wireless receiver and a second wireless receiver, and the position estimating component estimates the positions of the first wireless transmission terminal and the second wireless transmission terminal at least using the first position estimation data and the second position estimation data corresponding to plural times transmitted from the first wireless receiver and the second wireless receiver.

8. A positioning system that uses a radio wave strength of a radio wave received from a wireless transmission terminal movable through a predetermined indoor space to locate a position of the wireless transmission terminal, the positioning system comprising:

plural wireless receivers disposed in the predetermined indoor space, the plural wireless receivers detecting the radio wave strength of the radio wave received from the wireless transmission terminal, and being configured to generate reception data including information relating to the radio wave strength; and a position estimating component estimating the position of the wireless transmission terminal based on positions of the plural wireless receivers using, as position estimation data, the reception data of a radio wave strength equal to or greater than a set threshold value in the reception data generatable by the plural wireless receivers, when the reception data of the radio wave strength equal to or greater than the set threshold value satisfy a redetermination condition relating to the set threshold value, at least one of the position estimating component and the plural wireless receivers determining the radio wave strength of the radio wave received from the wireless transmission terminal to reset the set threshold value.

9. The positioning system according to claim 8, wherein at least one of the position estimating component and the plural wireless receivers uses, as the redetermination condition, a situation in which a rate of change at which a highest radio wave strength out of the position estimation data changes becomes equal to or greater than a determination rate of change.

10. The positioning system according to claim 8, wherein at least one of the position estimating component and the plural wireless receivers is configured to not perform the determination resetting the set threshold value within a predetermined grace period after having reset the set threshold value.

11. The positioning system according to claim 10, wherein at least one of the position estimating component and the plural wireless receivers sets the grace period in a case in which the set threshold value has been reset a predetermined number of times or more within a certain time period.

12. The positioning system according to claim 8, wherein the position estimating component, when resetting the set threshold value, sets a redetermination period and lowers the set threshold value or cancels the setting of the set threshold value in regard to the wireless receivers in a predetermined range including the position where the wireless transmission terminal had been before the redetermination period.

13. The positioning system according to claim 12, wherein the position estimating component sets the predetermined range excluding outer peripheral areas of the positions of the plural wireless receivers.

14. A positioning system that uses a radio wave strength of a radio wave received from a first wireless transmission terminal movable through a predetermined indoor space to locate a position of the first wireless transmission terminal and uses a radio wave strength of a radio wave received from a second wireless transmission terminal movable through the predetermined indoor space to locate a position of the second wireless transmission terminal, the positioning system comprising:

plural wireless receivers disposed in the predetermined indoor space, the plural wireless receivers detecting the radio wave strengths of the radio waves received from the first wireless transmission terminal and the second wireless transmission terminal, and being configured to generate reception data including information relating to the radio wave strengths; and a position estimating component estimating the positions of the first wireless transmission terminal and the second wireless transmission terminal based on positions of the plural wireless receivers using first position estimation data and second position estimation data in a limited range of the reception data generatable by the plural wireless receivers, at least one of the position estimating component and the plural wireless receivers acquiring the first position estimation data limited to a first set region suited to the first wireless transmission terminal from the reception data receivable in regard to the first wireless transmission terminal and the second position estimation data limited to a second set region suited to the second wireless transmission terminal from the reception data receivable in regard to the second wireless transmission terminal, at least one of the position estimating component and the plural wireless receivers setting the first set region using a geographical location centered on the wireless receiver at which the radio wave strength of the radio wave received from the first wireless transmission terminal is strongest out of the plural wireless receivers, the first set region being a geometrical shape centered on the one of the plural wireless receivers receiving the strongest radio wave and including the plural wireless receivers located within the geometrical shape and setting the second set region using a geographical location centered on the wireless receiver at which the radio wave strength of the radio wave received from the second wireless transmission terminal is strongest out of the plural wireless receivers, the second set region being a geometrical shape centered on the one of the plural wireless receivers receiving the strongest radio wave and including the plural wireless receivers located within the geometrical shape.

15. A positioning system that uses a radio wave strength of a radio wave received from a wireless transmission terminal movable through a predetermined indoor space to locate a position of the wireless transmission terminal, the positioning system comprising:

plural wireless receivers disposed in the predetermined indoor space, the plural wireless receivers detecting the radio wave strength of the radio wave received from the wireless transmission terminal, and being configured to generate reception data including information relating to the radio wave strength; and a position estimating component estimating the position of the wireless transmission terminal based on positions of the plural wireless receivers using, as position estimation data, the reception data of a radio wave strength equal to or greater than a set threshold value in the reception data generatable by the plural wireless receivers, when the reception data of the radio wave strength equal to or greater than the set threshold value satisfy a redetermination condition relating to the set threshold value, at least one of the position estimating component and the plural wireless receivers determining the radio wave strength of the radio wave received from the wireless transmission terminal to reset the set threshold value, at least one of the position estimating component and the plural wireless receivers using, as the redetermination condition, a situation in which a radio wave strength difference relating to the position estimation data becomes equal to or greater than a determination value.

* * * * *